(12) United States Patent
Chen et al.

(10) Patent No.: US 11,039,144 B2
(45) Date of Patent: Jun. 15, 2021

(54) METHOD AND APPARATUS FOR IMAGE CODING AND DECODING THROUGH INTER-PREDICTION

(71) Applicant: Huawei Technologies Co., Ltd., Shenzhen (CN)

(72) Inventors: Xu Chen, Shenzhen (CN); Jicheng An, Shenzhen (CN); Jianhua Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/371,499

(22) Filed: Apr. 1, 2019

(65) Prior Publication Data

US 2019/0230362 A1  Jul. 25, 2019

Related U.S. Application Data

(63) Continuation of application No. PCT/CN2016/101289, filed on Sep. 30, 2016.

(51) Int. Cl.
*H04N 11/02* (2006.01)
*H04N 19/139* (2014.01)
(Continued)

(52) U.S. Cl.
CPC ......... *H04N 19/139* (2014.11); *H04N 19/105* (2014.11); *H04N 19/176* (2014.11);
(Continued)

(58) Field of Classification Search
CPC .. H04N 19/139; H04N 19/105; H04N 19/176; H04N 19/523; H04N 19/53; H04N 19/533; H04N 19/577; H04N 19/61
(Continued)

(56) References Cited

U.S. PATENT DOCUMENTS

| 5,778,097 A | 7/1998 | Nickerson |
| 2004/0052507 A1* | 3/2004 | Kondo ............ H04N 19/137 386/329 |

(Continued)

FOREIGN PATENT DOCUMENTS

| CN | 1492687 A | 4/2004 |
| CN | 1671209 A | 9/2005 |

(Continued)

OTHER PUBLICATIONS

Machine Translation and Abstract of Chinese Publication No. CN1492687, Apr. 28, 2004, 14 pages.

(Continued)

*Primary Examiner* — Jayanti K Patel
*Assistant Examiner* — Richard B Carter
(74) *Attorney, Agent, or Firm* — Conley Rose, P.C.

(57) ABSTRACT

A decoding method includes determining prediction motion information of a first decoding block, performing bidirectional prediction on the first decoding block based on the prediction motion information to obtain a first decoding prediction block, performing motion search of first precision on a prediction reference image block to obtain at least one second decoding prediction block, where a search location of the motion search is determined using a motion vector predictor and the first precision, calculating a difference between the first decoding prediction block and each second decoding prediction block to obtain a target motion vector predictor of the first decoding block, and updating the target motion vector predictor through motion search.

20 Claims, 17 Drawing Sheets

(51) Int. Cl.

| | | |
|---|---|---|
| *H04N 19/176* | (2014.01) | |
| *H04N 19/577* | (2014.01) | |
| *H04N 19/533* | (2014.01) | |
| *H04N 19/53* | (2014.01) | |
| *H04N 19/61* | (2014.01) | |
| *H04N 19/105* | (2014.01) | |
| *H04N 19/523* | (2014.01) | |

(52) U.S. Cl.
CPC .......... *H04N 19/523* (2014.11); *H04N 19/53* (2014.11); *H04N 19/533* (2014.11); *H04N 19/577* (2014.11); *H04N 19/61* (2014.11)

(58) Field of Classification Search
USPC ............. 375/240.03, 240.12, 240.14–240.16
See application file for complete search history.

(56) References Cited

U.S. PATENT DOCUMENTS

| | | | |
|---|---|---|---|
| 2005/0207496 A1 | 9/2005 | Komiya et al. | |
| 2006/0050786 A1* | 3/2006 | Tanizawa | H04N 19/19 375/240.03 |
| 2008/0002774 A1* | 1/2008 | Hoshino | H04N 19/56 375/240.16 |
| 2009/0116760 A1 | 5/2009 | Boon et al. | |
| 2010/0014765 A1 | 1/2010 | Kotaka et al. | |
| 2011/0261882 A1 | 10/2011 | Zheng et al. | |
| 2012/0106645 A1 | 5/2012 | Lin et al. | |
| 2013/0315308 A1* | 11/2013 | Sugio | H04N 19/44 375/240.14 |
| 2014/0112391 A1 | 4/2014 | Matsu et al. | |
| 2014/0133560 A1* | 5/2014 | Kim | H04N 19/513 375/240.12 |
| 2014/0205014 A1* | 7/2014 | Nakamura | H04N 19/577 375/240.16 |
| 2016/0050428 A1 | 2/2016 | Tanizawa et al. | |
| 2016/0286230 A1 | 9/2016 | Li et al. | |
| 2017/0054998 A1 | 2/2017 | Ugur et al. | |
| 2017/0171543 A1 | 6/2017 | Moriya et al. | |

FOREIGN PATENT DOCUMENTS

| | | |
|---|---|---|
| CN | 101198063 A | 6/2008 |
| CN | 101631244 A | 1/2010 |
| CN | 101860747 A | 10/2010 |
| CN | 101931803 A | 12/2010 |
| CN | 103503458 A | 1/2014 |
| EP | 2091258 B1 | 8/2009 |
| JP | 2011517227 A | 5/2011 |
| JP | 2011217104 A | 10/2011 |
| RU | 2523071 C1 | 7/2014 |
| RU | 2573747 C2 | 1/2016 |
| RU | 2586876 C2 | 6/2016 |
| WO | 2007125856 A1 | 11/2007 |

OTHER PUBLICATIONS

Machine Translation and Abstract of Chinese Publication No. CN101860747, Oct. 13, 2010, 22 pages.
Foreign Communication From a Counterpart Application, PCT Application No. PCT/CN2016/101289, English Translation of International Search Report dated Jun. 23, 2017, 2 pages.
Foreign Communication From a Counterpart Application, PCT Application No. PCT/CN2016/101289, English Translation of Written Opinion dated Jun. 23, 2017, 3 pages.
Foreign Communication From a Counterpart Application, Russian Application No. 2019113299, Russian Notice of Allowance dated Sep. 30, 2016, 26 pages.
Foreign Communication From a Counterpart Application, Russian Application No. 2019113299, Russian Search Report dated Sep. 30, 2016, 2 pages.
Foreign Communication From a Counterpart Application, Russian Application No. 2019113299, English Translation of Russian Decision of Grant dated Sep. 30, 2016, 22 pages.
Chen, J., et al. "Algorithm Description of Joint Exploration Test Model 3," XP30150223, Joint Video Exploration Team (JVET) of ITU-T SG 16 WP 3 and ISO/IEC JTC 1/SC 29/WG 11, JVET-C1001v1, 3rd Meeting: Geneva, CH, May 26-Jun. 1, 2016, 35 pages.
Foreign Communication From a Counterpart Application, European Application No. 16917372.1, Extended European Search Report dated Jul. 23, 2019, 8 pages.

* cited by examiner

METHOD AND APPARATUS FOR IMAGE CODING AND DECODING THROUGH INTER-PREDICTION

CROSS-REFERENCE TO RELATED APPLICATIONS

This disclosure is a continuation of International Patent Disclosure No. PCT/CN2016/101289 filed on Sep. 30, 2016, the disclosure of which is hereby incorporated by reference in its entirety.

TECHNICAL FIELD

The present disclosure relates to the field of video image technologies, and in particular, to a method and an apparatus for image coding and decoding through inter-prediction.

BACKGROUND

In a video coding and decoding framework, a hybrid coding structure is usually used for video sequence coding and decoding. An encoder side of the hybrid coding structure usually includes a prediction module, a transformation module, a quantization module, and an entropy encoding module. A decoder side of the hybrid coding structure usually includes an entropy decoding module, a dequantization module, an inverse transformation module, and a prediction compensation module. These coding and decoding modules can be combined to effectively remove redundant information of a video sequence and ensure that a coded image of the video sequence is obtained on the decoder side.

In the video coding and decoding framework, an image of a video sequence is usually divided into image blocks for coding. One image is divided into several image blocks, and these image blocks are coded and decoded using the foregoing modules.

In the foregoing modules, the prediction module is configured to obtain prediction block information of an image block of a coded image of a video sequence on the encoder side to determine, based on a specific mode, whether a residual of the image block needs to be obtained. The prediction compensation module is configured to obtain prediction block information of a current decoded image block on the decoder side, and then determine, based on a specific mode, whether to obtain the current decoded image block based on an image block residual obtained through decoding. The prediction module and the prediction compensation module usually include two technologies intra prediction and inter-prediction. In the inter-prediction technology, an image that is adjacent to a current image and used for inter-prediction is referred to as a reference image.

In the inter-prediction technology, to effectively remove redundant information of a current image block, an encoder side and a decoder side need to obtain a matched image block that is most similar to the current image block from the reference image to reduce a residual of the current image block. When inter-prediction is performed on the current image block, the reference image is searched for an appropriate matched image block based on prediction motion information. In this case, motion vector information in the prediction motion information is determined by motion vector information of an adjacent block. All information of a reference image may be used for coding and decoding the current image block. It can be learned that, in interframe coding and decoding, motion vector information of an adjacent block is directly used as a motion vector predictor of a current block. This manner of directly obtaining a motion vector predictor of inter-prediction inevitably causes a deviation of prediction motion precision.

SUMMARY

Embodiments of the present disclosure provide a method and an apparatus for image coding and decoding through inter-prediction to improve motion precision of inter-prediction.

According to a first aspect, a method for image coding through inter-prediction is provided, including determining prediction motion information of a first coding block, where the prediction motion information includes a motion vector predictor and prediction reference image information, and the prediction reference image information is used to represent a prediction reference image block, performing bidirectional prediction on the first coding block based on the prediction motion information to obtain an initial coding prediction block of the first coding block, and obtaining a first coding prediction block of the first coding block based on the initial coding prediction block, performing motion search of first precision on the prediction reference image block to obtain at least one second coding prediction block, where a search location of the motion search is determined using the motion vector predictor and the first precision, calculating a difference between the first coding prediction block and each second coding prediction block, and using a motion vector predictor between the first coding block and a second coding prediction block with a smallest difference as a target motion vector predictor of the first coding block, performing bidirectional prediction on the first coding block based on the target motion vector predictor to obtain a third coding prediction block of the first coding block, and obtaining a target coding prediction block of the first coding block based on the third coding prediction block, and coding the first coding block based on the target coding prediction block.

The beneficial effect lies in that when coding the first coding block, an encoder side can update the target motion vector predictor through motion search to improve motion precision of inter-prediction.

With reference to the first aspect, in a possible design, the prediction motion information includes forward prediction motion information or backward prediction motion information, the motion vector predictor includes a forward motion vector predictor or a backward motion vector predictor, and the prediction reference image block includes a forward prediction reference image block or a backward prediction reference image block.

With reference to the first aspect, in a possible design, the initial coding prediction block includes an initial forward coding prediction block or an initial backward coding prediction block, and performing bidirectional prediction on the first coding block based on the prediction motion information to obtain an initial coding prediction block of the first coding block includes performing forward prediction on the first coding block based on the forward prediction motion information to obtain the initial forward coding prediction block of the first coding block, or performing backward prediction on the first coding block based on the backward prediction motion information to obtain the initial backward coding prediction block of the first coding block.

With reference to the first aspect, in a possible design, obtaining a first coding prediction block of the first coding block based on the initial coding prediction block includes the following manner performing weighted summation on the initial forward coding prediction block and the initial backward coding prediction block to obtain the first coding prediction block of the first coding block, or using the initial forward coding prediction block as the first coding prediction block of the first coding block, or using the initial backward coding prediction block as the first coding prediction block of the first coding block.

The beneficial effect lies in that after performing bidirectional prediction on the first coding block based on the prediction motion information, the encoder side may combine the initial forward coding prediction block and the initial backward coding prediction block to obtain the first coding prediction block, or may obtain the first coding prediction block based on an initial coding prediction block in a single direction. Implementations are diversified, and may be flexibly selected based on an actual situation.

With reference to the first aspect, in a possible design, the second coding prediction block includes a forward second coding prediction block or a backward second coding prediction block, and performing motion search of first precision on the prediction reference image block to obtain at least one second coding prediction block includes performing motion search of the first precision on the forward prediction reference image block based on the forward motion vector predictor, and using each found forward coding prediction block as the forward second coding prediction block to obtain the at least one second coding prediction block, or performing motion search of the first precision on the backward prediction reference image block based on the backward motion vector predictor, and using each found backward coding prediction block as the backward second coding prediction block to obtain the at least one second coding prediction block, where the first precision includes integer pixel precision, ½ pixel precision, ¼ pixel precision, or ⅛ pixel precision.

With reference to the first aspect, in a possible design, the target motion vector predictor includes a target forward motion vector predictor or a target backward motion vector predictor, and calculating a difference between the first coding prediction block and each second coding prediction block, and using a motion vector predictor between the first coding block and a second coding prediction block with a smallest difference as a target motion vector predictor of the first coding block includes comparing differences between the forward second coding prediction blocks and the first coding prediction block, and using a target forward motion vector predictor between the first coding block and a forward second coding prediction block with a smallest difference as the target motion vector predictor, or comparing differences between the backward second coding prediction blocks and the first coding prediction block, and using a target backward motion vector predictor between the first coding block and a backward second coding prediction block with a smallest difference as the target motion vector predictor.

The beneficial effect lies in that differences between second coding prediction blocks obtained by performing motion search on the prediction reference image block and the first coding prediction block are compared to update the target motion vector predictor of the first coding block, thereby improving motion precision of inter-prediction.

With reference to the first aspect, in a possible design, the third coding prediction block of the first coding block includes a forward third coding prediction block or a backward third coding prediction block, and performing bidirectional prediction on the first coding block based on the target motion vector predictor to obtain a third coding prediction block of the first coding block includes performing forward prediction on the first coding block based on the target forward motion vector predictor to obtain the forward third coding prediction block of the first coding block, or performing backward prediction on the first coding block based on the target backward motion vector predictor to obtain the backward third coding prediction block of the first coding block.

With reference to the first aspect, in a possible design, obtaining a target coding prediction block of the first coding block based on the third coding prediction block includes performing weighted summation on the forward third coding prediction block and the backward third coding prediction block to obtain the target coding prediction block of the first coding block, or using the forward third coding prediction block as the target coding prediction block of the first coding block, or using the backward third coding prediction block as the target coding prediction block of the first coding block.

The beneficial effect lies in that after performing bidirectional prediction on a first coding block based on the target motion vector predictor to obtain the third coding prediction block, the encoder side may combine the forward third coding prediction block and the backward third coding prediction block to obtain the target coding prediction block of the first coding block, or may obtain the target coding prediction block of the first coding block based on a third coding prediction block in a single direction. Implementations are diversified, and may be flexibly selected based on an actual situation.

According to a second aspect, a method for image decoding through inter-prediction is provided, including determining prediction motion information of a first decoding block, where the prediction motion information includes a motion vector predictor and prediction reference image information, and the prediction reference image information is used to represent a prediction reference image block, performing bidirectional prediction on the first decoding block based on the prediction motion information to obtain an initial decoding prediction block of the first decoding block, and obtaining a first decoding prediction block of the first decoding block based on the initial decoding prediction block, performing motion search of first precision on the prediction reference image block to obtain at least one second decoding prediction block, where a search location of the motion search is determined using the motion vector predictor and the first precision, calculating a difference between the first decoding prediction block and each second decoding prediction block, and using a motion vector predictor between the first decoding block and a second decoding prediction block with a smallest difference as a target motion vector predictor of the first decoding block, performing bidirectional prediction on the first decoding block based on the target motion vector predictor to obtain a third decoding prediction block of the first decoding block, and obtaining a target decoding prediction block of the first decoding block based on the third decoding prediction block, and decoding the first decoding block based on the target decoding prediction block.

The beneficial effect lies in that when decoding the first decoding block, a decoder side can update the target motion vector predictor through motion search to improve motion precision of inter-prediction.

With reference to the second aspect, in a possible design, the prediction motion information includes forward prediction motion information or backward prediction motion information, the motion vector predictor includes a forward motion vector predictor or a backward motion vector predictor, and the prediction reference image block includes a forward prediction reference image block or a backward prediction reference image block.

With reference to the second aspect, in a possible design, the initial decoding prediction block includes an initial forward decoding prediction block or an initial backward decoding prediction block, and performing bidirectional prediction on the first decoding block based on the prediction motion information to obtain an initial decoding prediction block of the first decoding block includes performing forward prediction on the first decoding block based on the forward prediction motion information to obtain the initial forward decoding prediction block of the first decoding block, or performing backward prediction on the first decoding block based on the backward prediction motion information to obtain the initial backward decoding prediction block of the first decoding block.

With reference to the second aspect, in a possible design, obtaining a first decoding prediction block of the first decoding block based on the initial decoding prediction block includes the following manner performing weighted summation on the initial forward decoding prediction block and the initial backward decoding prediction block to obtain the first decoding prediction block of the first decoding block, or using the initial forward decoding prediction block as the first decoding prediction block of the first decoding block, or using the initial backward decoding prediction block as the first decoding prediction block of the first decoding block.

The beneficial effect lies in that after performing bidirectional prediction on the first decoding block based on the prediction motion information, the decoder side may combine the initial forward decoding prediction block and the initial backward decoding prediction block to obtain the first decoding prediction block, or may obtain the first decoding prediction block based on an initial decoding prediction block in a single direction. Implementations are diversified, and may be flexibly selected based on an actual situation.

With reference to the second aspect, in a possible design, the second decoding prediction block includes a forward second decoding prediction block or a backward second decoding prediction block, and performing motion search of first precision on the prediction reference image block to obtain at least one second decoding prediction block includes performing motion search of the first precision on the forward prediction reference image block based on the forward motion vector predictor, and using each found forward decoding prediction block as the forward second decoding prediction block to obtain the at least one second decoding prediction block, or performing motion search of the first precision on the backward prediction reference image block based on the backward motion vector predictor, and using each found backward decoding prediction block as the backward second decoding prediction block to obtain the at least one second decoding prediction block, where the first precision includes integer pixel precision, ½ pixel precision, ¼ pixel precision, or ⅛ pixel precision.

With reference to the second aspect, in a possible design, the target motion vector predictor includes a target forward motion vector predictor or a target backward motion vector predictor, and calculating a difference between the first decoding prediction block and each second decoding prediction block and using a motion vector predictor between the first decoding block and a second decoding prediction block with a smallest difference as a target motion vector predictor of the first decoding block includes comparing differences between the forward second decoding prediction blocks and the first decoding prediction block, and using a target forward motion vector predictor between the first decoding block and a forward second decoding prediction block with a smallest difference as the target motion vector predictor, or comparing differences between the backward second decoding prediction blocks and the first decoding prediction block, and using a target backward motion vector predictor between the first decoding block and a backward second decoding prediction block with a smallest difference as the target motion vector predictor.

The beneficial effect lies in that differences between second decoding prediction blocks obtained by performing motion search on the prediction reference image block and the first decoding prediction block are compared to update the target motion vector predictor of the first decoding block, thereby improving motion precision of inter-prediction.

With reference to the second aspect, in a possible design, the third decoding prediction block of the first decoding block includes a forward third decoding prediction block or a backward third decoding prediction block, and performing bidirectional prediction on the first decoding block based on the target motion vector predictor to obtain a third decoding prediction block of the first decoding block includes performing forward prediction on the first decoding block based on the target forward motion vector predictor to obtain the forward third decoding prediction block of the first decoding block, or performing backward prediction on the first decoding block based on the target backward motion vector predictor to obtain the backward third decoding prediction block of the first decoding block.

With reference to the second aspect, in a possible design, obtaining a target decoding prediction block of the first decoding block based on the third decoding prediction block includes the following manner performing weighted summation on the forward third decoding prediction block and the backward third decoding prediction block to obtain the target decoding prediction block of the first decoding block, or using the forward third decoding prediction block as the target decoding prediction block of the first decoding block, or using the backward third decoding prediction block as the target decoding prediction block of the first decoding block.

The beneficial effect lies in that after performing bidirectional prediction on a third decoding block based on the target motion vector predictor to obtain the third decoding prediction block, the decoder side may combine the forward third decoding prediction block and the backward third decoding prediction block to obtain the target decoding prediction block of the first decoding block, or may obtain the target decoding prediction block of the first decoding block based on a third decoding prediction block in a single direction. Implementations are diversified, and may be flexibly selected based on an actual situation.

According to a third aspect, an apparatus for image coding through inter-prediction is provided, including a determining unit configured to determine prediction motion information of a first coding block, where the prediction motion information includes a motion vector predictor and prediction reference image information, and the prediction reference image information is used to represent a prediction reference image block, a processing unit configured to perform bidirectional prediction on the first coding block based on the prediction motion information to obtain an initial coding prediction block of the first coding block, and obtain a first coding prediction block of the first coding block based on the initial coding prediction block, perform motion search of first precision on the prediction reference image block to obtain at least one second coding prediction block, where a search location of the motion search is determined using the motion vector predictor and the first precision, calculate a difference between the first coding prediction block and each second coding prediction block, and use a motion vector predictor between the first coding block and a second coding prediction block with a smallest difference as a target motion vector predictor of the first coding block, and perform bidirectional prediction on the first coding block based on the target motion vector predictor to obtain a third coding prediction block of the first coding block, and a coding unit configured to obtain a target coding prediction block of the first coding block based on the third coding prediction block, and code the first coding block based on the target coding prediction block.

With reference to the third aspect, in a possible design, the prediction motion information includes forward prediction motion information or backward prediction motion information, the motion vector predictor includes a forward motion vector predictor or a backward motion vector predictor, and the prediction reference image block includes a forward prediction reference image block or a backward prediction reference image block.

With reference to the third aspect, in a possible design, the initial coding prediction block includes an initial forward coding prediction block or an initial backward coding prediction block, and when performing bidirectional prediction on the first coding block based on the prediction motion information to obtain the initial coding prediction block of the first coding block, the processing unit is configured to perform forward prediction on the first coding block based on the forward prediction motion information to obtain the initial forward coding prediction block of the first coding block, or perform backward prediction on the first coding block based on the backward prediction motion information to obtain the initial backward coding prediction block of the first coding block.

With reference to the third aspect, in a possible design, when obtaining the first coding prediction block of the first coding block based on the initial coding prediction block, the processing unit is configured to perform weighted summation on the initial forward coding prediction block and the initial backward coding prediction block to obtain the first coding prediction block of the first coding block, or use the initial forward coding prediction block as the first coding prediction block of the first coding block, or use the initial backward coding prediction block as the first coding prediction block of the first coding block.

With reference to the third aspect, in a possible design, the second coding prediction block includes a forward second coding prediction block or a backward second coding prediction block, and when performing motion search of the first precision on the prediction reference image block based on the motion vector predictor to obtain the at least one second coding prediction block, the processing unit is configured to perform motion search of the first precision on the forward prediction reference image block based on the forward motion vector predictor, and use each found forward coding prediction block as the forward second coding prediction block to obtain the at least one second coding prediction block, or perform motion search of the first precision on the backward prediction reference image block based on the backward motion vector predictor, and use each found backward coding prediction block as the backward second coding prediction block to obtain the at least one second coding prediction block, where the first precision includes integer pixel precision, ½ pixel precision, ¼ pixel precision, or ⅛ pixel precision.

With reference to the third aspect, in a possible design, the target motion vector predictor includes a target forward motion vector predictor or a target backward motion vector predictor, and when calculating the difference between the first coding prediction block and each second coding prediction block, and using the motion vector predictor between the first coding block and the second coding prediction block with a smallest difference as the target motion vector predictor of the first coding block, the processing unit is configured to compare differences between the forward second coding prediction blocks and the first coding prediction block, and use a target forward motion vector predictor between the first coding block and a forward second coding prediction block with a smallest difference as the target motion vector predictor, or compare differences between the backward second coding prediction blocks and the first coding prediction block, and use a target backward motion vector predictor between the first coding block and a backward second coding prediction block with a smallest difference as the target motion vector predictor.

With reference to the third aspect, in a possible design, the third coding prediction block of the first coding block includes a forward third coding prediction block or a backward third coding prediction block, and when performing bidirectional prediction on the first coding block based on the target motion vector predictor to obtain the third coding prediction block of the first coding block, the processing unit is configured to perform forward prediction on the first coding block based on the target forward motion vector predictor to obtain the forward third coding prediction block of the first coding block, or perform backward prediction on the first coding block based on the target backward motion vector predictor to obtain the backward third coding prediction block of the first coding block.

With reference to the third aspect, in a possible design, when obtaining the target coding prediction block of the first coding block based on the third coding prediction block, the processing unit is configured to perform weighted summation on the forward third coding prediction block and the backward third coding prediction block to obtain the target coding prediction block of the first coding block, or use the forward third coding prediction block as the target coding prediction block of the first coding block, or use the backward third coding prediction block as the target coding prediction block of the first coding block.

According to a fourth aspect, an apparatus for image decoding through inter-prediction is provided, including a determining unit configured to determine prediction motion information of a first decoding block, where the prediction motion information includes a motion vector predictor and prediction reference image information, and the prediction reference image information is used to represent a prediction reference image block, a processing unit configured to perform bidirectional prediction on the first decoding block based on the prediction motion information to obtain an initial decoding prediction block of the first decoding block, and obtain a first decoding prediction block of the first decoding block based on the initial decoding prediction block, perform motion search of first precision on the prediction reference image block to obtain at least one second decoding prediction block, where a search location of the motion search is determined using the motion vector predictor and the first precision, calculate a difference between the first decoding prediction block and each second decoding prediction block, and use a motion vector predictor between the first decoding block and a second decoding prediction block with a smallest difference as a target motion vector predictor of the first decoding block, and perform bidirectional prediction on the first decoding block based on the target motion vector predictor to obtain a third decoding prediction block of the first decoding block, and a decoding unit configured to obtain a target decoding prediction block of the first decoding block based on the third decoding prediction block, and decode the first decoding block based on the target decoding prediction block.

With reference to the fourth aspect, in a possible design, the prediction motion information includes forward prediction motion information or backward prediction motion information, the motion vector predictor includes a forward motion vector predictor or a backward motion vector predictor, and the prediction reference image block includes a forward prediction reference image block or a backward prediction reference image block.

With reference to the fourth aspect, in a possible design, the initial decoding prediction block includes an initial forward decoding prediction block or an initial backward decoding prediction block, and when performing bidirectional prediction on the first decoding block based on the prediction motion information to obtain the initial decoding prediction block of the first decoding block, the processing unit is configured to perform forward prediction on the first decoding block based on the forward prediction motion information to obtain the initial forward decoding prediction block of the first decoding block, or perform backward prediction on the first decoding block based on the backward prediction motion information to obtain the initial backward decoding prediction block of the first decoding block.

With reference to the fourth aspect, in a possible design, when obtaining the first decoding prediction block of the first decoding block based on the initial decoding prediction block, the processing unit is configured to perform weighted summation on the initial forward decoding prediction block and the initial backward decoding prediction block to obtain the first decoding prediction block of the first decoding block, or use the initial forward decoding prediction block as the first decoding prediction block of the first decoding block, or use the initial backward decoding prediction block as the first decoding prediction block of the first decoding block.

With reference to the fourth aspect, in a possible design, the second decoding prediction block includes a forward second decoding prediction block or a backward second decoding prediction block, and when performing motion search of the first precision on the prediction reference image block based on the motion vector predictor to obtain the at least one second decoding prediction block, the processing unit is configured to perform motion search of the first precision on the forward prediction reference image block based on the forward motion vector predictor, and use each found forward decoding prediction block as the forward second decoding prediction block to obtain the at least one second decoding prediction block, or perform motion search of the first precision on the backward prediction reference image block based on the backward motion vector predictor, and use each found backward decoding prediction block as the backward second decoding prediction block to obtain the at least one second decoding prediction block, where the first precision includes integer pixel precision, ½ pixel precision, ¼ pixel precision, or ⅛ pixel precision.

With reference to the fourth aspect, in a possible design, the target motion vector predictor includes a target forward motion vector predictor or a target backward motion vector predictor, and when calculating the difference between the first decoding prediction block and each second decoding prediction block, and using the motion vector predictor between the first decoding block and the second decoding prediction block with a smallest difference as the target motion vector predictor of the first decoding block, the processing unit is configured to compare differences between the forward second decoding prediction blocks and the first decoding prediction block, and use a target forward motion vector predictor between the first decoding block and a forward second decoding prediction block with a smallest difference as the target motion vector predictor, or compare differences between the backward second decoding prediction blocks and the first decoding prediction block, and use a target backward motion vector predictor between the first decoding block and a backward second decoding prediction block with a smallest difference as the target motion vector predictor.

With reference to the fourth aspect, in a possible design, the third decoding prediction block of the first decoding block includes a forward third decoding prediction block or a backward third decoding prediction block, and when performing bidirectional prediction on the first decoding block based on the target motion vector predictor to obtain the third decoding prediction block of the first decoding block, the processing unit is configured to perform forward prediction on the first decoding block based on the target forward motion vector predictor to obtain the forward third decoding prediction block of the first decoding block, or perform backward prediction on the first decoding block based on the target backward motion vector predictor to obtain the backward third decoding prediction block of the first decoding block.

With reference to the fourth aspect, in a possible design, when obtaining the target decoding prediction block of the first decoding block based on the third decoding prediction block, the processing unit is configured to perform weighted summation on the forward third decoding prediction block and the backward third decoding prediction block to obtain the target decoding prediction block of the first decoding block, or use the forward third decoding prediction block as the target decoding prediction block of the first decoding block, or use the backward third decoding prediction block as the target decoding prediction block of the first decoding block.

According to a fifth aspect, a coding device is provided, and the device includes a processor and a memory, where the memory stores a computer readable program, and the processor runs the program in the memory to implement the coding method according to the first aspect.

According to a sixth aspect, a decoding device is provided, and the device includes a processor and a memory, where the memory stores a computer readable program, and the processor runs the program in the memory to implement the decoding method according to the second aspect.

According to a seventh aspect, a computer storage medium is provided configured to store a computer software instruction for the first aspect and the second aspect, where the computer software instruction includes a program designed for performing the foregoing aspects.

It should be understood that the third to the seventh aspects of the embodiments of the present disclosure are consistent with the technical solutions of the first and the second aspects of the embodiments of the present disclosure, and beneficial effects obtained by all aspects and corresponding implementable design manners are similar. Details are not described again.

DESCRIPTION OF EMBODIMENTS

Figure 1A:
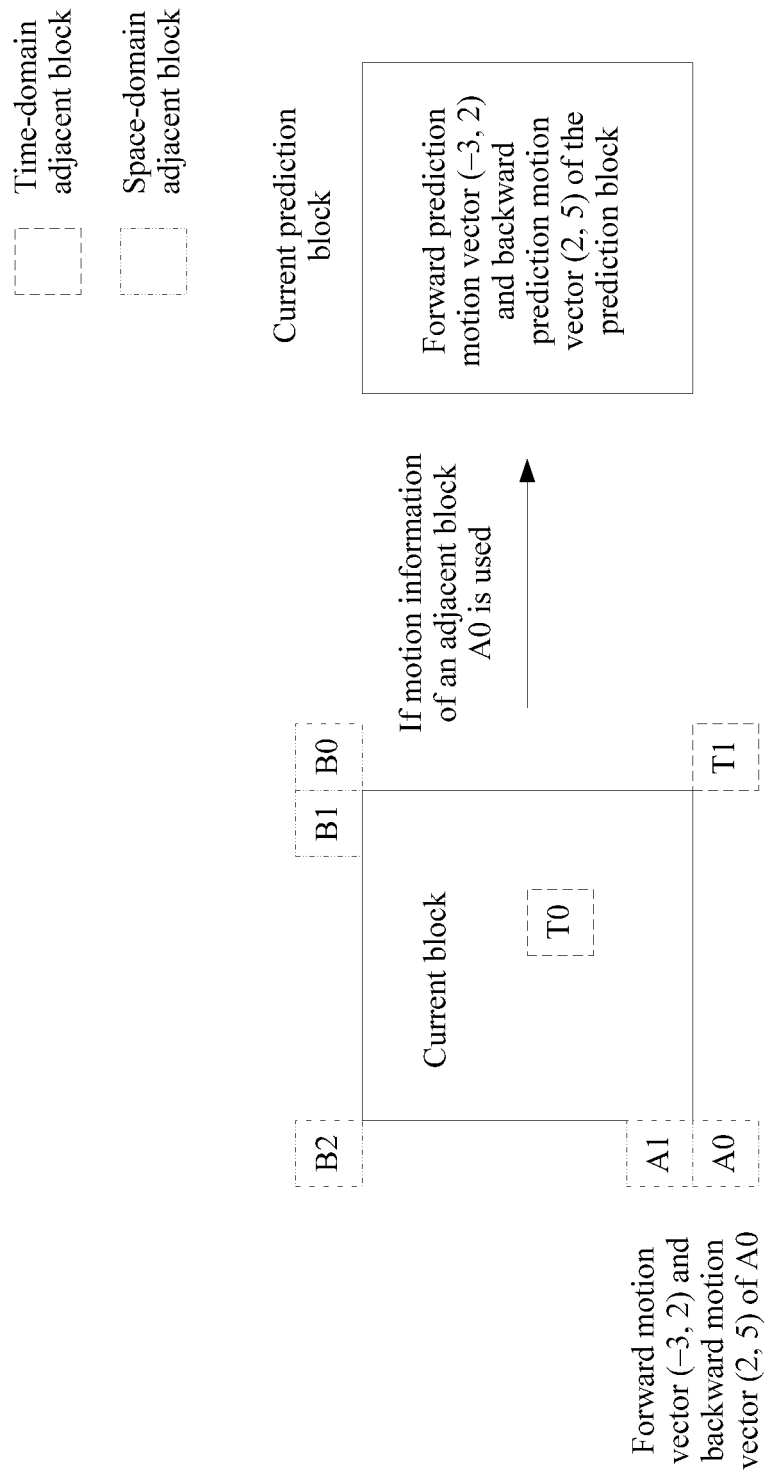
FIG. 1A and FIG. 1B are respectively schematic diagrams of selecting prediction motion information of a current block in a merge mode and a non-merge mode.

The following clearly describes the technical solutions in the embodiments of the present disclosure with reference to the accompanying drawings in the embodiments of the present disclosure. The described embodiments are some rather than all of the embodiments of the present disclosure. All other embodiments obtained by a person of ordinary skill in the art based on the embodiments of the present disclosure without creative efforts shall fall within the protection scope of the present disclosure.

Inter-prediction technology is classified into a merge mode and a non-merge mode, and the non-merge mode is further classified into a skip mode and a non-skip mode.

In the non-merge mode and a non-skip mode of the merge mode in the inter-prediction technology, redundant information of a current image block is removed based on pixel information of a coded or decoded image adjacent to a current image to obtain a residual.

In the inter-prediction technology, to effectively remove the redundant information of the current image block, an encoder side or a decoder side needs to obtain an image block that is most similar to the current image block from a reference image to reduce a residual of the current image block. The encoder side or the decoder side usually obtains an image block of the foregoing reference image through motion estimation. In an existing video coding and decoding technology, a reference image is usually searched for an appropriate matched image block in a unit of an image block during coding and decoding in a motion estimation process. In some embodiments, an image block is a prediction unit of an image to be coded by an encoder side or a prediction unit of an image to be reconstructed by a decoder side. In some embodiments, an image block is a transformation unit of an image to be coded by the encoder side or a transformation unit of an image to be reconstructed by the decoder side. In some embodiments, an image block is a coding unit or a coding subunit of an image to be coded by the encoder side, or a decoding unit or a decoding subunit of an image to be reconstructed by the decoder side. No limitation is imposed.

In the non-merge mode of the inter-prediction technology, an encoder side performs subtraction on a pixel value corresponding to a current image block and a pixel value corresponding to a matched image block to obtain a residual, performs entropy encoding on a value obtained after the residual is transformed and quantized, and finally writes, into a code stream, both a bit stream obtained through entropy encoding and a motion offset (namely, a motion vector difference) obtained through searching. Correspondingly, during prediction compensation (or referred to as motion compensation), a decoder side first performs entropy encoding after obtaining an entropy encoding bit stream, to obtain a corresponding residual and a corresponding motion vector difference, then obtains a motion vector value based on the obtained motion vector difference and a motion vector value of an adjacent block, obtains a corresponding matched image block from a reference image based on the motion vector value, and adds a pixel value corresponding to the matched image block and a pixel value corresponding to the residual to obtain a value of the decoded current image block.

In the non-skip mode of the merge mode of the inter-prediction technology, an encoder side performs subtraction on a pixel value corresponding to a current image block and a pixel value corresponding to a matched image block to obtain a residual, performs entropy encoding on a value obtained after the residual is transformed and quantized, and finally writes a bit stream obtained through entropy encoding into a code stream. Correspondingly, during prediction compensation (or referred to as motion compensation), a decoder side first performs entropy encoding after obtaining an entropy encoding bit stream, to obtain a corresponding residual, obtains a corresponding matched image block from a reference image based on a motion vector value of an adjacent block, and adds a pixel value corresponding to the matched image block and a pixel value corresponding to the residual to obtain a value of the decoded current image block.

In a skip mode of the merge mode of the inter-prediction technology, to save a bit rate, a residual and a motion vector difference do not need to be obtained. In both coding and decoding processes, a corresponding matched image block is directly obtained based on motion information of an adjacent block and is used as a value of a current image block.

Figure 1B:
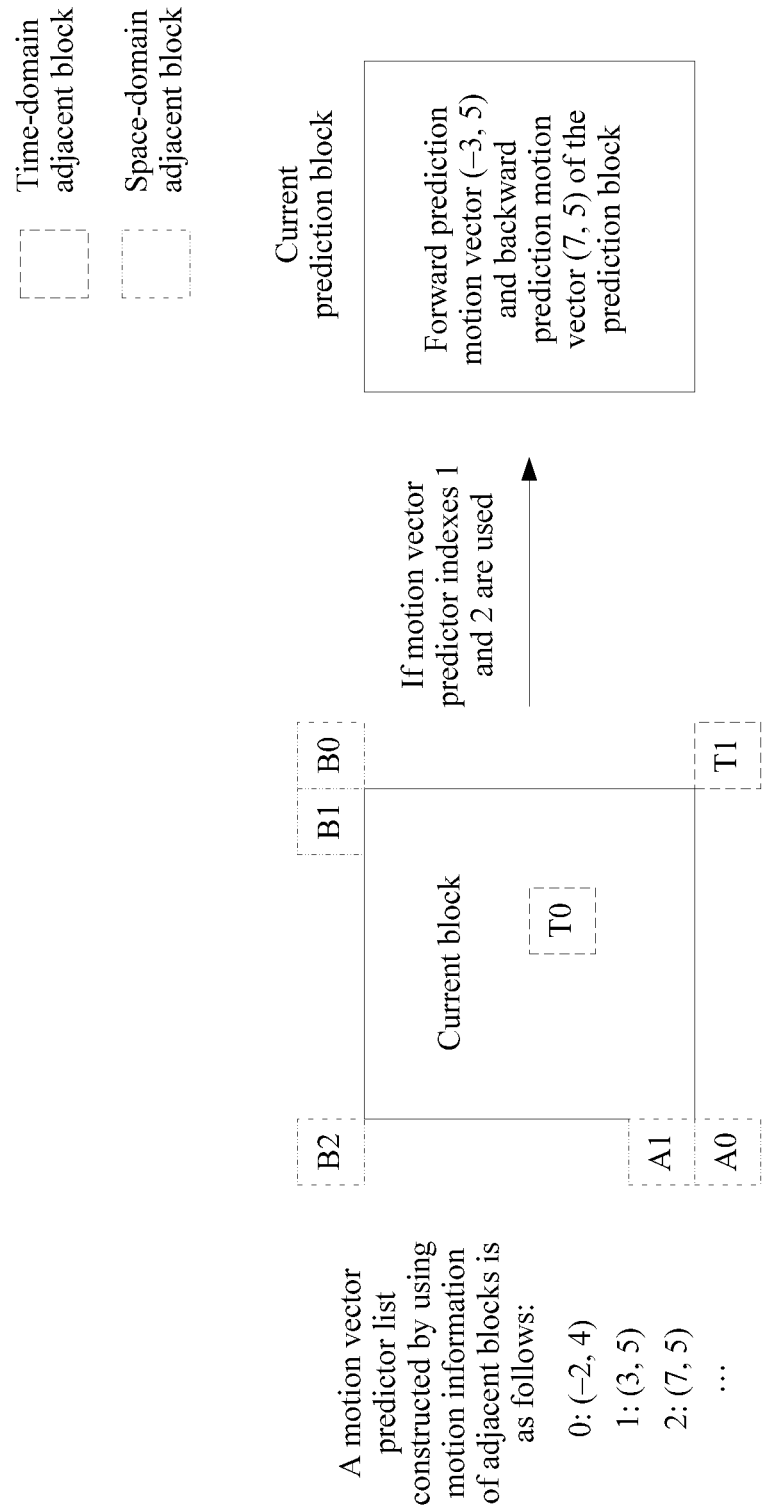

As shown in FIG. 1A, in a merge mode, adjacent blocks are marked as different index values, and the index values are used to determine an adjacent block whose motion vector information is used by a current block as prediction motion information of the current block. As shown in FIG. 1B, in a non-merge mode, a motion vector predictor list is constructed by detecting an adjacent block, and a motion vector predictor is selected from the motion vector predictor list for a current block as a motion vector predictor of the current block. It can be learned that, in inter-frame coding and decoding, motion vector information of an adjacent block is directly used as a motion vector predictor of a current block. This manner of directly obtaining a motion vector predictor of inter-prediction inevitably causes a deviation of prediction motion precision.

Figure 2:
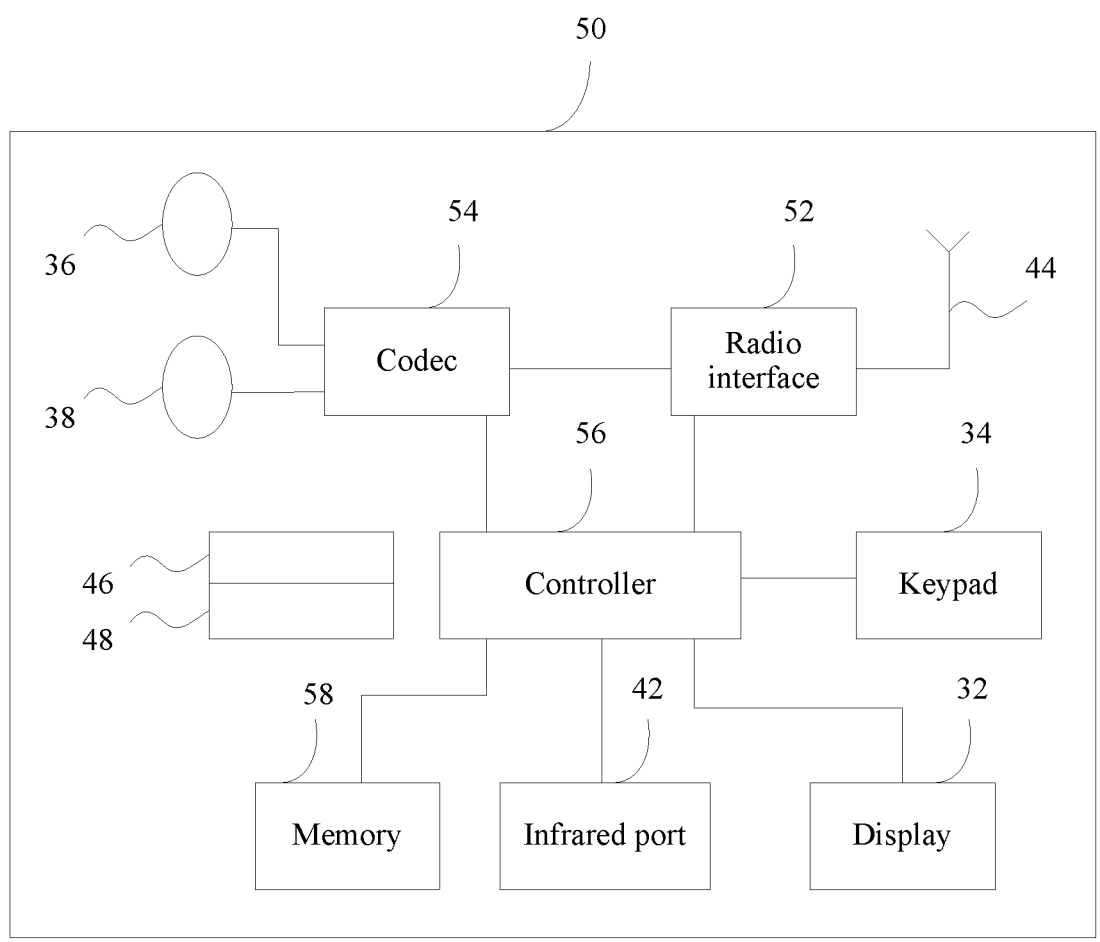
FIG. 2 is a schematic block diagram of a video codec apparatus or an electronic device.
Figure 3:
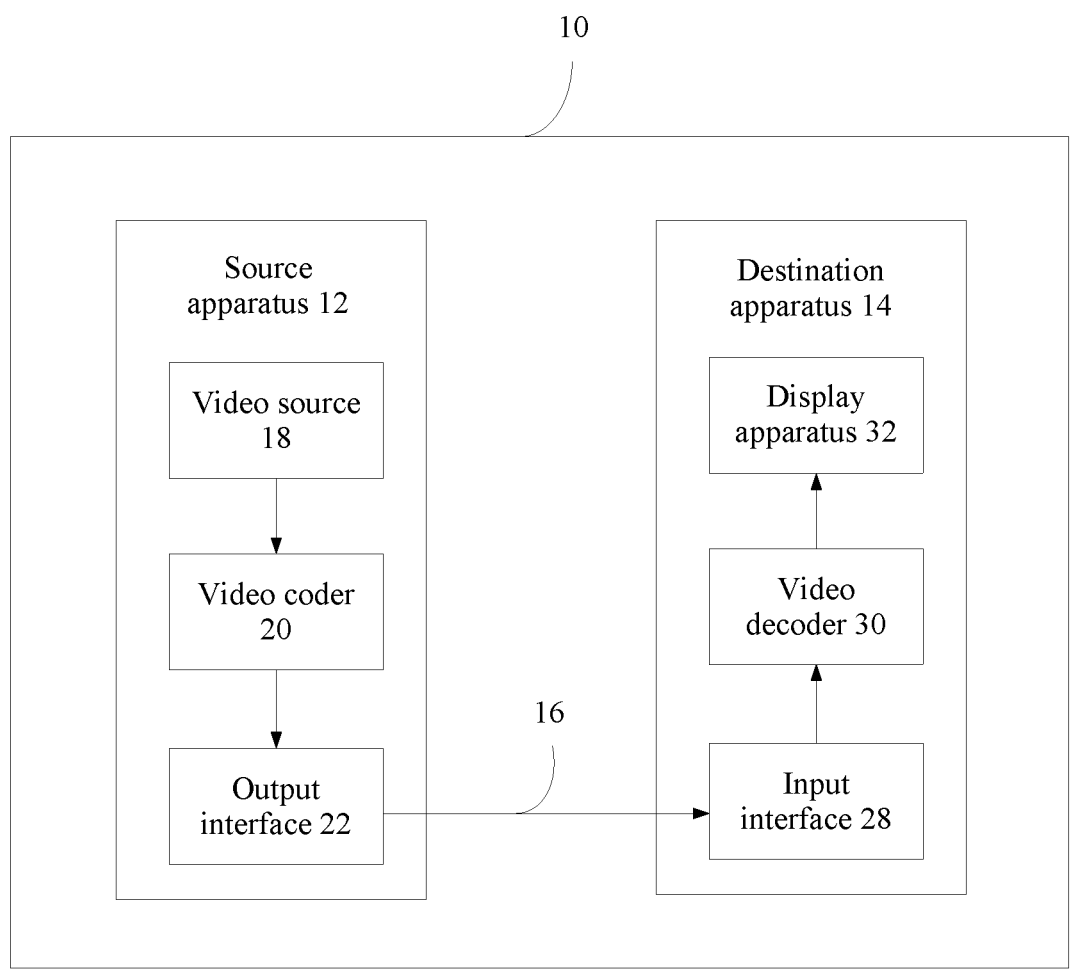
FIG. 3 is a schematic block diagram of a video codec system.

FIG. 2 is a schematic block diagram of a video codec apparatus or electronic device 50. The apparatus or the electronic device may be incorporated into a codec according to an embodiment of the present disclosure. FIG. 3 is a schematic apparatus diagram of a video codec system according to an embodiment of the present disclosure. The following describes the units of FIG. 2 and FIG. 3.

The electronic device 50 may be, for example, a mobile terminal in a wireless communications system. It should be understood that the embodiments of the present disclosure may be implemented by any electronic device or apparatus that may need to code, or decode, or code and decode a video image.

The apparatus 50 may include a housing configured to be incorporated into and protect the apparatus. The apparatus 50 may further include a display 32 in a form of a liquid crystal display. In another embodiment of the present disclosure, the display may be any appropriate display technology applied to image or video display. The apparatus 50 may further include a keypad 34. In another embodiment of the present disclosure, any appropriate data or user interface mechanism may be used. For example, a user interface may be implemented as a virtual keyboard or a data entry system to serve as a part of a touch-sensitive display. The apparatus may include a microphone 36 or any appropriate audio input, and the audio input may be digital or analog signal input. The apparatus 50 may further include the following audio output device. In this embodiment of the present disclosure, the audio output device may be any one of a headset 38, a speaker, an analog audio output connection, or a digital audio output connection. The apparatus 50 may also include a battery 40. In another embodiment of the present disclosure, the apparatus may be powered by any appropriate mobile energy device, such as a solar cell, a fuel cell, or a clock mechanism generator. The apparatus may further include an infrared port 42 configured to perform short-range line-of-sight communication with another device. In another embodiment, the apparatus 50 may further include any appropriate short-range communication solution, such as a Bluetooth wireless connection or a USB/live line wired connection.

The apparatus 50 may include a controller 56 or a processor configured to control the apparatus 50. The controller 56 may be connected to a memory 58. In this embodiment of the present disclosure, the memory may store image data and audio data, and/or may store an instruction implemented on the controller 56. The controller 56 may also be connected to a codec circuit 54 adapted to implement audio and/or video data coding and decoding, or the controller 56 is connected to a codec circuit 54 to implement auxiliary coding and decoding.

The apparatus 50 may further include a card reader 48 and a smart card 46 that are configured to provide user information and are adapted to provide information for network authentication and authorized user authentication.

The apparatus 50 may further include a radio interface circuit 52. The radio interface circuit is connected to the controller and is adapted to generate, for example, a wireless communication signal used to communicate with a cellular communications network, a wireless communications system, or a wireless local area network. The apparatus 50 may further include an antenna 44. The antenna is connected to the radio interface circuit 52 to send radio frequency signals generated in the radio interface circuit 52 to other (a plurality of) apparatuses and receive radio frequency signals from other (a plurality of) apparatuses.

In some embodiments of the present disclosure, the apparatus 50 includes a camera that is capable of recording or detecting a single frame. The codec 54 or the controller receives and processes these single frames. In some embodiments of the present disclosure, the apparatus may receive to-be-processed video image data from another device before transmission and/or storage. In some embodiments of the present disclosure, the apparatus 50 may receive, through a wireless or wired connection, an image for coding/decoding.

FIG. 3 is a schematic block diagram of another video codec system 10 according to an embodiment of the present disclosure. As shown in FIG. 3, the video codec system 10 includes a source apparatus 12 and a destination apparatus 14. The source apparatus 12 generates coded video data. Therefore, the source apparatus 12 may be referred to as a video coding apparatus or a video coding device. The destination apparatus 14 may decode the coded video data generated by the source apparatus 12. Therefore, the destination apparatus 14 may be referred to as a video decoding apparatus or a video decoding device. The source apparatus 12 and the destination apparatus 14 may be instances of a video codec apparatus or a video codec device. The source apparatus 12 and the destination apparatus 14 may include a wide range of apparatuses, including a desktop computer, a mobile computing apparatus, a notebook (for example, a laptop) computer, a tablet computer, a set-top box, a handset such as a smartphone, a television, a camera, a display apparatus, a digital media player, a video game console, an in-vehicle computer, or another similar apparatus.

The destination apparatus 14 may receive the coded video data from the source apparatus 12 through a channel 16. The channel 16 may include one or more media and/or apparatuses that can transmit the coded video data from the source apparatus 12 to the destination apparatus 14. In an instance, the channel 16 may include one or more communications media that enable the source apparatus 12 to directly transmit the coded video data to the destination apparatus 14 in real time. In this instance, the source apparatus 12 may modulate the coded video data according to a communications standard (for example, a wireless communication protocol), and may transmit the modulated video data to the destination apparatus 14. The one or more communications media may include wireless and/or wired communications media, such as a radio frequency (RF) spectrum or one or more physical transmission lines. The one or more communications media may form a part of a packet-based network (for example, a local area network, a wide area network, or a global network (for example, the Internet)). The one or more communications media may include a router, a switch, a base station, or another device that facilitates communication from the source apparatus 12 to the destination apparatus 14.

In another instance, the channel 16 may include a storage medium storing the coded video data generated by the source apparatus 12. In this instance, the destination apparatus 14 may access the storage medium through disk access or card access. The storage medium may include various local access data storage media, such as a BLU-RAY, a Digital Video Disk (DVD), a Compact Disc Read Only Memory (CD-ROM), a flash memory, or other appropriate digital storage media configured to store the coded video data.

In another instance, the channel 16 may include a file server or another intermediate storage apparatus that stores the coded video data generated by the source apparatus 12. In this instance, the destination apparatus 14 may access, through streaming transmission or downloading, the coded video data stored in the file server or the another intermediate storage apparatus. The file server may be of a server type that can store coded video data and transmit the coded video data to the destination apparatus 14. The instance file server includes a web server (for example, applied to a website), a File Transfer Protocol (FTP) server, a network-attached storage (NAS) apparatus, and a local disk drive.

The destination apparatus 14 may access the coded video data through a standard data connection (for example, an Internet connection). An instance type of the data connection includes a radio channel (for example, a Wireless Fidelity (Wi-Fi) connection), a wired connection (for example, a Digital Subscriber Line (DSL) or a cable modem), or a combination of both that are adapted to access the coded video data stored on the file server. Transmission of the coded video data from the file server may be streaming transmission, download transmission, or a combination thereof.

The technology of the present disclosure is not limited to a wireless disclosure scenario. For example, the technology may be used to support video coding and decoding in the following various multimedia disclosures over-the-air television broadcasting, cable television transmission, satellite television transmission, streaming video transmission (for example, through the Internet), coding of video data stored on data storage media, decoding of video data stored on data storage media, and other disclosures. In some instances, the video codec system 10 may be configured to support unidirectional or bidirectional video transmission to support disclosures such as video streaming transmission, video playback, video broadcast, and/or video-telephony.

In the instance in FIG. 3, the source apparatus 12 includes a video source 18, a video coder 20, and an output interface 22. In some instances, the output interface 22 may include a modulator/demodulator (modem) and/or a transmitter. The video source 18 may include a video capture apparatus (for example, a video camera), a video archive including previously captured video data, a video input interface configured to receive video data from a video content provider, and/or a computer graphics system configured to generate video data, or a combination of the foregoing video data sources.

The video coder 20 can code video data from the video source 18. In some instances, the source apparatus 12 directly transmits the coded video data to the destination apparatus 14 using the output interface 22. The coded video data may also be stored on the storage medium or the file server for later access by the destination apparatus 14 for decoding and/or playback.

In the instance in FIG. 3, the destination apparatus 14 includes an input interface 28, a video decoder 30, and a display apparatus 32. In some instances, the input interface 28 includes a receiver and/or a modem. The input interface 28 may receive the coded video data through the channel 16. The display apparatus 32 may be integrated into the destination apparatus 14 or may be located outside the destination apparatus 14. Usually, the display apparatus 32 displays decoded video data. The display apparatus 32 may include various display apparatuses, such as a liquid crystal display (LCD), a plasma display, an organic light-emitting diode (OLED) display, or another type of display apparatus.

The video coder 20 and the video decoder 30 may operate according to a video compression standard (for example, the High Efficiency Video Coding (HEVC) H.265 standard), and may comply with an HEVC test model (HM). The text description Internet Telecommuniations Union (ITU)-Telecommunications Standardization Sector (T) H.265 (V3) (April 2015) of the H.265 standard was published on Apr. 29, 2015 and can be downloaded from http//handle.itu.int/11.1002/1000/12455, and entire content of the file is incorporated herein by reference.

Alternatively, the video coder 20 and the video decoder 30 may operate according to another proprietary or industry standard. The standard includes ITU-T H.261, ISO/IEC MPEG-1 Visual ITU-T H.262, ISO/IEC MPEG-2 Visual, ITU-T H.263, ISO/IEC MPEG-4 Visual, or ITU-T H.264 (also referred to as ISO/IEC MPEG-4 AVC), and includes scalable video coding (SVC) and multi-view video coding (MVC) extensions. It should be understood that the technology of the present disclosure is not limited to any specific codec standard or technology.

In addition, FIG. 3 is merely an instance, and the technology of the present disclosure may be applied to video codec disclosures (for example, unilateral video coding or video decoding) that do not necessarily include any data communication between a coding apparatus and a decoding apparatus. In another instance, data is retrieved from a local memory, and the data is transmitted through network streaming transmission, or the data is operated in a similar manner. The coding apparatus may code data and store the data in the memory, and/or the decoding apparatus may retrieve data from the memory and decode the data. In many instances, coding and decoding are performed by a plurality of apparatuses that do not communicate with each other but only code data to the memory and/or retrieve data from the memory and decode the data.

The video coder 20 and the video decoder 30 each may be implemented as any one of a plurality of appropriate circuits, such as one or more microprocessors, a digital signal processor (DSP), an disclosure-specific integrated circuit (ASIC), a field-programmable gate array (FPGA), discrete logic, hardware, or any combination thereof. If the technology is partially or entirely implemented using software, an apparatus may store an instruction of the software in an appropriate non-transitory computer readable storage medium, and may execute, using one or more processors, an instruction in hardware to execute the technology in the present disclosure. Any one of the foregoing items (including hardware, software, a combination of hardware and software, and the like) may be considered as the one or more processors. Each of the video coder 20 and the video decoder 30 may be included in one or more coders or decoders, either of the video coder 20 and the video decoder 30 may be integrated as a part of a combined coder/decoder (codec (CODEC)) in another apparatus.

In the present disclosure, it may be usually indicated that the video coder 20 sends information to another apparatus (for example, the video decoder 30) using a signal. The term "sending using a signal" may usually refer to a syntactic element and/or represent transmission of coded video data. The transmission may occur in real time or near real time. Alternatively, the transmission may occur over a time span, for example, may occur when a syntactic element is stored in a computer readable storage medium using coded binary data during coding. The syntactic element may be retrieved by the decoding apparatus at any time after being stored in the medium.

Figure 4:
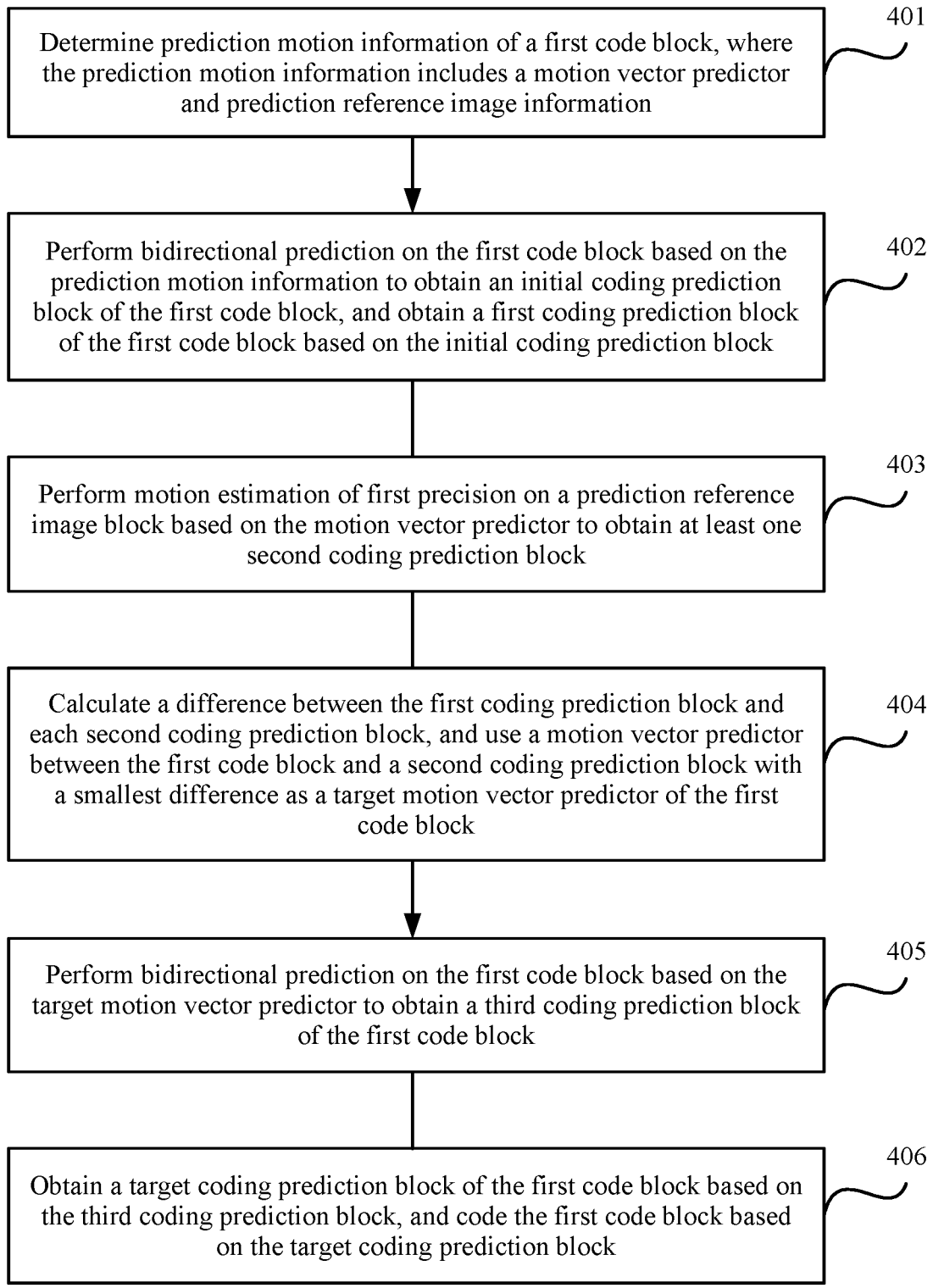
FIG. 4 is a flowchart of a method for image coding through inter-prediction according to an embodiment of the present disclosure.

As shown in FIG. 4, an embodiment of the present disclosure provides a method for image coding through inter-prediction. A specific procedure is as follows:

Step 401: Determine prediction motion information of a first coding block, where the prediction motion information includes a motion vector predictor and prediction reference image information, and the prediction reference image information is used to represent a prediction reference image block.

The first coding block is a currently to-be-processed and to-be-coded block, the motion vector predictor in the prediction motion information includes a forward motion vector predictor or a backward motion vector predictor, and the prediction reference image information includes reference frame index information of a forward prediction reference image block and reference frame index information of a backward prediction reference image block.

Further, the prediction reference image block of the first coding block is obtained based on the motion vector predictor or the prediction reference image information of the first coding block.

Optionally, the prediction motion information of the first coding block includes the forward motion vector predictor, the backward motion vector predictor, a picture order count (POC) corresponding to the forward prediction reference image block, and a POC corresponding to the backward prediction reference image block, or may include only the forward motion vector predictor and a POC corresponding to the forward prediction reference image block, or may include only the backward motion vector predictor and a POC corresponding to the backward prediction reference image block.

For a method for determining the prediction motion information of the first coding block, refer to a method for determining prediction motion information of a current coding block.

If a merge mode of inter-prediction is used, a candidate prediction motion information list is constructed based on motion information of an adjacent block of the first coding block, and candidate prediction motion information is selected from the candidate prediction motion information list as the prediction motion information of the first coding block. The candidate motion information list includes a motion vector predictor, reference frame index information of a reference image block, and the like. It should be noted that the motion vector predictor in this mode is a motion vector value of the adjacent block.

If a non-merge mode of inter-prediction is used, a motion vector predictor list is constructed based on motion information of an adjacent block of the first coding block, and a motion vector is selected from the motion vector predictor list as the motion vector predictor of the first coding block. It should be noted that the motion vector predictor in this mode may be a motion vector value of the adjacent block, or may be a sum of a motion vector value of a selected adjacent block and a motion vector difference of the first coding block. The motion vector difference is a difference between a motion vector obtained by performing motion estimation on the first coding block and the motion vector value of the selected adjacent block.

Step 402: Perform bidirectional prediction on the first coding block based on the prediction motion information to obtain an initial coding prediction block of the first coding block, and obtain a first coding prediction block of the first coding block based on the initial coding prediction block.

Further, when a POC corresponding to the prediction reference image block is not equal to a POC of the first coding block, bidirectional prediction including forward prediction and backward prediction is performed on the first coding block based on the prediction motion information. When the POC corresponding to the prediction reference image block is less than the POC of the first coding block, forward prediction is performed on the first coding block based on the prediction motion information, or when the POC corresponding to the prediction reference image block is greater than the POC of the first coding block, backward prediction is performed on the first coding block based on the prediction motion information.

Performing bidirectional prediction on the first coding block based on the prediction motion information to obtain an initial coding prediction block of the first coding block includes the following processes:

Step S421: Perform forward prediction on the first coding block based on the prediction motion information, to be specific, perform forward prediction on the first coding block based on forward prediction motion information to obtain an initial forward coding prediction block of the first coding block.

In a possible implementation, forward prediction is performed on the first coding block based on the forward prediction reference image block in the prediction motion information to obtain the initial forward coding prediction block of the first coding block.

In another possible implementation, forward prediction is performed on the first coding block based on the forward motion vector predictor in the prediction motion information to obtain the initial forward coding prediction block of the first coding block.

Step S422: Perform backward prediction on the first coding block based on the prediction motion information, to be specific, perform backward prediction on the first coding block based on backward prediction motion information to obtain an initial backward coding prediction block of the first coding block.

In a possible implementation, backward prediction is performed on the first coding block based on the backward prediction reference image block in the prediction motion information to obtain the backward initial coding prediction block of the first coding block.

In another possible implementation, backward prediction is performed on the first coding block based on the backward motion vector predictor in the prediction motion information to obtain the backward initial coding prediction block of the first coding block.

The initial coding prediction block includes the initial forward coding prediction block and the initial backward coding prediction block.

Further, obtaining a first coding prediction block of the first coding block based on the initial coding prediction block includes the following three implementations:

In a first implementation, weighted summation is performed on the initial forward coding prediction block and the initial backward coding prediction block to obtain the first coding prediction block of the first coding block.

In this implementation, optionally, an average value of the initial forward coding prediction block and the initial backward coding prediction block is used as the first coding prediction block of the first coding block.

In a second implementation, the initial forward coding prediction block is used as the first coding prediction block of the first coding block.

In a third implementation, the initial backward coding prediction block is used as the first coding prediction block of the first coding block.

Step 403: Perform motion estimation of first precision on the prediction reference image block based on the motion vector predictor to obtain at least one second coding prediction block.

In some embodiments, this step is to perform motion search of the first precision on the prediction reference image block, where a search location of the motion search is determined using the motion vector predictor and the first precision. In a feasible implementation, the location of the motion search is a location that is around a location represented by the motion vector predictor and that is within coverage of the first precision. For example, if the location indicated by the motion vector predictor is (1, 1), and the first precision is ½ pixel precision, the location of the motion search is (1.5, 1), (1.5, 1.5), (1.5, −0.5), (1, 1), (1, 1.5), (1, −0.5), (−0.5, 1), (−0.5, 1.5), and (−0.5, −0.5).

Performing motion estimation of first precision on the prediction reference image block based on the motion vector predictor to obtain at least one second coding prediction block includes the following processes:

Step S431: Perform motion search of the first precision on the forward prediction reference image block based on the forward motion vector predictor, and use each found forward coding prediction block as a forward second coding prediction block to obtain the at least one second coding prediction block.

Step S432: Perform motion search of the first precision on the backward prediction reference image block based on the backward motion vector predictor, and use each found backward coding prediction block as a backward second coding prediction block to obtain the at least one second coding prediction block, where the second coding prediction block includes the forward second coding prediction block and the backward second coding prediction block.

The first precision includes integer pixel precision, ½ pixel precision, ¼ pixel precision, or ⅛ pixel precision. This is not limited.

Step 404: Calculate a difference between the first coding prediction block and each second coding prediction block, and use a motion vector predictor between the first coding block and a second coding prediction block with a smallest difference as a target motion vector predictor of the first coding block.

Calculating a difference between the first coding prediction block and each second coding prediction block, and using a motion vector predictor between the first coding block and a second coding prediction block with a smallest difference as a target motion vector predictor of the first coding block includes the following processes:

Step S441: Compare differences between the forward second coding prediction blocks and the first coding prediction block, and use a target forward motion vector predictor between the first coding block and a forward second coding prediction block with a smallest difference as the target motion vector predictor.

Step S442: Compare differences between the backward second coding prediction blocks and the first coding prediction block, and use a target backward motion vector predictor between the first coding block and a backward second coding prediction block with a smallest difference as the target motion vector predictor, where the target motion vector predictor includes the target forward motion vector predictor and the target backward motion vector predictor.

When differences between second coding prediction blocks and the first coding prediction block are compared, a sum of absolute values of pixel differences in the two image blocks may be used as a value of the difference between the second coding prediction block and the first coding prediction block. Optionally, a sum of square values of pixel differences in the two image blocks may be used as a value of the difference between the second coding prediction block and the first coding prediction block. A difference comparison method is not limited.

Step 405: Perform bidirectional prediction on the first coding block based on the target motion vector predictor to obtain a third coding prediction block of the first coding block.

Performing bidirectional prediction on the first coding block based on the target motion vector predictor to obtain a third coding prediction block of the first coding block includes the following processes:

Step S451: Perform forward prediction on the first coding block based on the target forward motion vector predictor to obtain a forward third coding prediction block of the first coding block.

Step S452: Perform backward prediction on the first coding block based on the target backward motion vector predictor to obtain a backward third coding prediction block of the first coding block, where the third coding prediction block of the first coding block includes the forward third coding prediction block and the backward third coding prediction block.

Step 406: Obtain a target coding prediction block of the first coding block based on the third coding prediction block, and code the first coding block based on the target coding prediction block.

Obtaining a target coding prediction block of the first coding block based on the third coding prediction block includes the following three implementations:

In a first implementation, weighted summation is performed on the forward third coding prediction block and the backward third coding prediction block to obtain the target coding prediction block of the first coding block.

In this implementation, optionally, an average value of the forward third coding prediction block and the backward third coding prediction block is used as the target coding prediction block of the first coding block.

In a second implementation, the forward third coding prediction block is used as the target coding prediction block of the first coding block.

In a third implementation, the backward third coding prediction block is used as the target coding prediction block of the first coding block.

It should be understood that, in some embodiments, a flag bit may be coded in higher layer information of a code stream, such as a slice level, a picture level, or a sequence level, and the flag bit is used to indicate whether the image coding method shown in FIG. 4 is applied.

Figure 5:
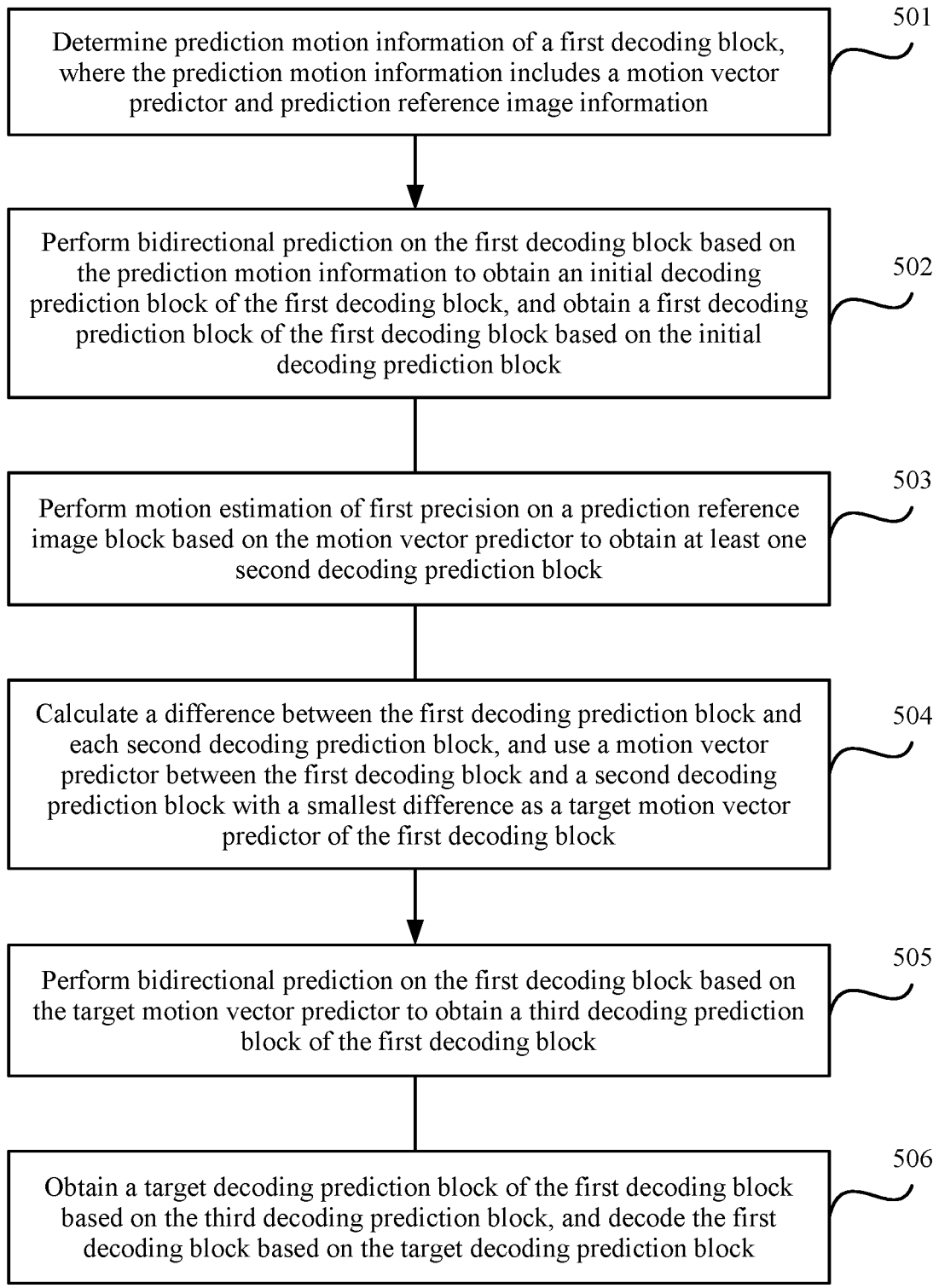
FIG. 5 is a flowchart of a method for image decoding through inter-prediction according to an embodiment of the present disclosure.

As shown in FIG. 5, an embodiment of the present disclosure provides a method for image decoding through inter-prediction. A specific procedure is as follows:

Step 501: Determine prediction motion information of a first decoding block, where the prediction motion information includes a motion vector predictor and prediction reference image information, and the prediction reference image information is used to represent a prediction reference image block.

The first decoding block is a currently to-be-processed block that needs to be constructed based on parsed code stream information, the motion vector predictor in the prediction motion information includes a forward motion vector predictor or a backward motion vector predictor, and the prediction reference image information includes reference frame index information of a forward prediction reference image block and reference frame index information of a backward prediction reference image block.

Further, the prediction reference image block of the first decoding block is obtained based on the motion vector predictor or the prediction reference image information of the first decoding block.

Optionally, the prediction motion information of the first decoding block includes the forward motion vector predictor, the backward motion vector predictor, a POC corresponding to the forward prediction reference image block, and a POC corresponding to the backward prediction reference image block, or may include only the forward motion vector predictor and a POC corresponding to the forward prediction reference image block, or may include only the backward motion vector predictor and a POC corresponding to the backward prediction reference image block.

For a method for determining the prediction motion information of the first decoding block, refer to a method for determining prediction motion information of a current decoding block.

If a merge mode of inter-prediction is used, a candidate prediction motion information list is constructed based on motion information of an adjacent block of the first decoding block, and candidate prediction motion information is selected from the candidate prediction motion information list as the prediction motion information of the first decoding block. The candidate motion information list includes a motion vector predictor, reference frame index information of a reference image block, and the like. It should be noted that the motion vector predictor in this mode is a motion vector value of the adjacent block.

If a non-merge mode of inter-prediction is used, a motion vector predictor list is constructed based on motion information of an adjacent block of the first decoding block, and a motion vector is selected from the motion vector predictor list as the motion vector predictor of the first decoding block. It should be noted that the motion vector predictor in this mode may be a motion vector value of the adjacent block, or may be a sum of a motion vector value of a selected adjacent block and a motion vector difference of the first decoding block. The motion vector difference may be directly obtained through decoding.

Step 502: Perform bidirectional prediction on the first decoding block based on the prediction motion information to obtain an initial decoding prediction block of the first decoding block, and obtain a first decoding prediction block of the first decoding block based on the initial decoding prediction block.

Further, when a POC corresponding to the prediction reference image block is not equal to a POC of the first decoding block, bidirectional prediction including forward prediction and backward prediction is performed on the first decoding block based on the prediction motion information. When the POC corresponding to the prediction reference image block is less than the POC of the first decoding block, forward prediction is performed on the first decoding block based on the prediction motion information, or when the POC corresponding to the prediction reference image block is greater than the POC of the first decoding block, backward prediction is performed on the first decoding block based on the prediction motion information.

Performing bidirectional prediction on the first decoding block based on the prediction motion information to obtain an initial decoding prediction block of the first decoding block includes the following processes:

Step S521: Perform forward prediction on the first decoding block based on the prediction motion information, to be specific, perform forward prediction on the first decoding block based on forward prediction motion information to obtain an initial forward decoding prediction block of the first decoding block.

In a possible implementation, forward prediction is performed on the first decoding block based on the forward prediction reference image block in the prediction motion information to obtain the initial forward decoding prediction block of the first decoding block.

In another possible implementation, forward prediction is performed on the first decoding block based on the forward motion vector predictor in the prediction motion information to obtain the initial forward decoding prediction block of the first decoding block.

Step S522: Perform backward prediction on the first decoding block based on the prediction motion information, to be specific, perform backward prediction on the first decoding block based on backward prediction motion information to obtain an initial backward decoding prediction block of the first decoding block.

In a possible implementation, backward prediction is performed on the first decoding block based on the backward prediction reference image block in the prediction motion information to obtain the backward initial decoding prediction block of the first decoding block.

In another possible implementation, backward prediction is performed on the first decoding block based on the backward motion vector predictor in the prediction motion information to obtain the backward initial decoding prediction block of the first decoding block.

The initial decoding prediction block includes the initial forward decoding prediction block and the initial backward decoding prediction block.

Further, obtaining a first decoding prediction block of the first decoding block based on the initial decoding prediction block includes the following three implementations:

In a first implementation, weighted summation is performed on the initial forward decoding prediction block and the initial backward decoding prediction block to obtain the first decoding prediction block of the first decoding block.

In this implementation, optionally, an average value of the initial forward decoding prediction block and the initial backward decoding prediction block is used as the first decoding prediction block of the first decoding block.

In a second implementation, the initial forward decoding prediction block is used as the first decoding prediction block of the first decoding block.

In a third implementation, the initial backward decoding prediction block is used as the first decoding prediction block of the first decoding block.

Step 503: Perform motion estimation of first precision on the prediction reference image block based on the motion vector predictor to obtain at least one second decoding prediction block.

In some embodiments, this step is to perform motion search of the first precision on the prediction reference image block, where a search location of the motion search is determined using the motion vector predictor and the first precision. In a feasible implementation, the location of the motion search is a location that is around a location represented by the motion vector predictor and that is within coverage of the first precision. For example, if the location indicated by the motion vector predictor is (1, 1), and the first precision is ½ pixel precision, the location of the motion search is (1.5, 1), (1.5, 1.5), (1.5, −0.5), (1, 1), (1, 1.5), (1, −0.5), (−0.5, 1), (−0.5, 1.5), and (−0.5, −0.5).

Performing motion estimation of first precision on the prediction reference image block based on the motion vector predictor to obtain at least one second decoding prediction block includes the following processes:

Step S531: Perform motion search of the first precision on the forward prediction reference image block based on the forward motion vector predictor, and use each found forward decoding prediction block as a forward second decoding prediction block to obtain the at least one second decoding prediction block.

Step S532: Perform motion search of the first precision on the backward prediction reference image block based on the backward motion vector predictor, and use each found backward decoding prediction block as a backward second decoding prediction block to obtain the at least one second decoding prediction block, where the second decoding prediction block includes the forward second decoding prediction block and the backward second decoding prediction block.

The first precision includes integer pixel precision, ½ pixel precision, ¼ pixel precision, or ⅛ pixel precision. This is not limited.

Step 504: Calculate a difference between the first decoding prediction block and each second decoding prediction block, and use a motion vector predictor between the first decoding block and a second decoding prediction block with a smallest difference as a target motion vector predictor of the first decoding block.

Calculating a difference between the first decoding prediction block and each second decoding prediction block, and using a motion vector predictor between the first decoding block and a second decoding prediction block with a smallest difference as a target motion vector predictor of the first decoding block includes the following processes:

Step S541: Compare differences between the forward second decoding prediction blocks and the first decoding prediction block, and use a target forward motion vector predictor between the first decoding block and a forward second decoding prediction block with a smallest difference as the target motion vector predictor.

Step S542: Compare differences between the backward second decoding prediction blocks and the first decoding prediction block, and use a target backward motion vector predictor between the first decoding block and a backward second decoding prediction block with a smallest difference as the target motion vector predictor, where the target motion vector predictor includes the target forward motion vector predictor and the target backward motion vector predictor.

When differences between second decoding prediction blocks and the first decoding prediction block are compared, a sum of absolute values of pixel differences in the two image blocks may be used as a value of the difference between the second decoding prediction block and the first decoding prediction block. Optionally, a sum of square values of pixel differences in the two image blocks may be used as a value of the difference between the second decoding prediction block and the first decoding prediction block. A difference comparison method is not limited.

Step 505: Perform bidirectional prediction on the first decoding block based on the target motion vector predictor to obtain a third decoding prediction block of the first decoding block.

Performing bidirectional prediction on the first decoding block based on the target motion vector predictor to obtain a third decoding prediction block of the first decoding block includes the following processes:

Step S551: Perform forward prediction on the first decoding block based on the target forward motion vector predictor to obtain a forward third decoding prediction block of the first decoding block.

Step S552: Perform backward prediction on the first decoding block based on the target backward motion vector predictor to obtain a backward third decoding prediction block of the first decoding block, where the third decoding prediction block of the first decoding block includes the forward third decoding prediction block and the backward third decoding prediction block.

Step 506: Obtain a target decoding prediction block of the first decoding block based on the third decoding prediction block, and decode the first decoding block based on the target decoding prediction block.

Obtaining a target decoding prediction block of the first decoding block based on the third decoding prediction block includes the following three implementations:

In a first implementation, weighted summation is performed on the forward third decoding prediction block and the backward third decoding prediction block to obtain the target decoding prediction block of the first decoding block.

In this implementation, optionally, an average value of the forward third decoding prediction block and the backward third decoding prediction block is used as the target decoding prediction block of the first decoding block.

In a second implementation, the forward third decoding prediction block is used as the target decoding prediction block of the first decoding block.

In a third implementation, the backward third decoding prediction block is used as the target decoding prediction block of the first decoding block.

It should be understood that, in some embodiments, corresponding to an encoder side, a flag bit may be first parsed in higher layer information of a code stream, such as a strip level, an image level, or a sequence level, and the flag bit is used to indicate whether the image decoding method shown in FIG. 5 is applied.

The following describes in detail the coding method in FIG. 4 and the decoding method in FIG. 5 using several specific embodiments.

Embodiment 1

Figure 6A:
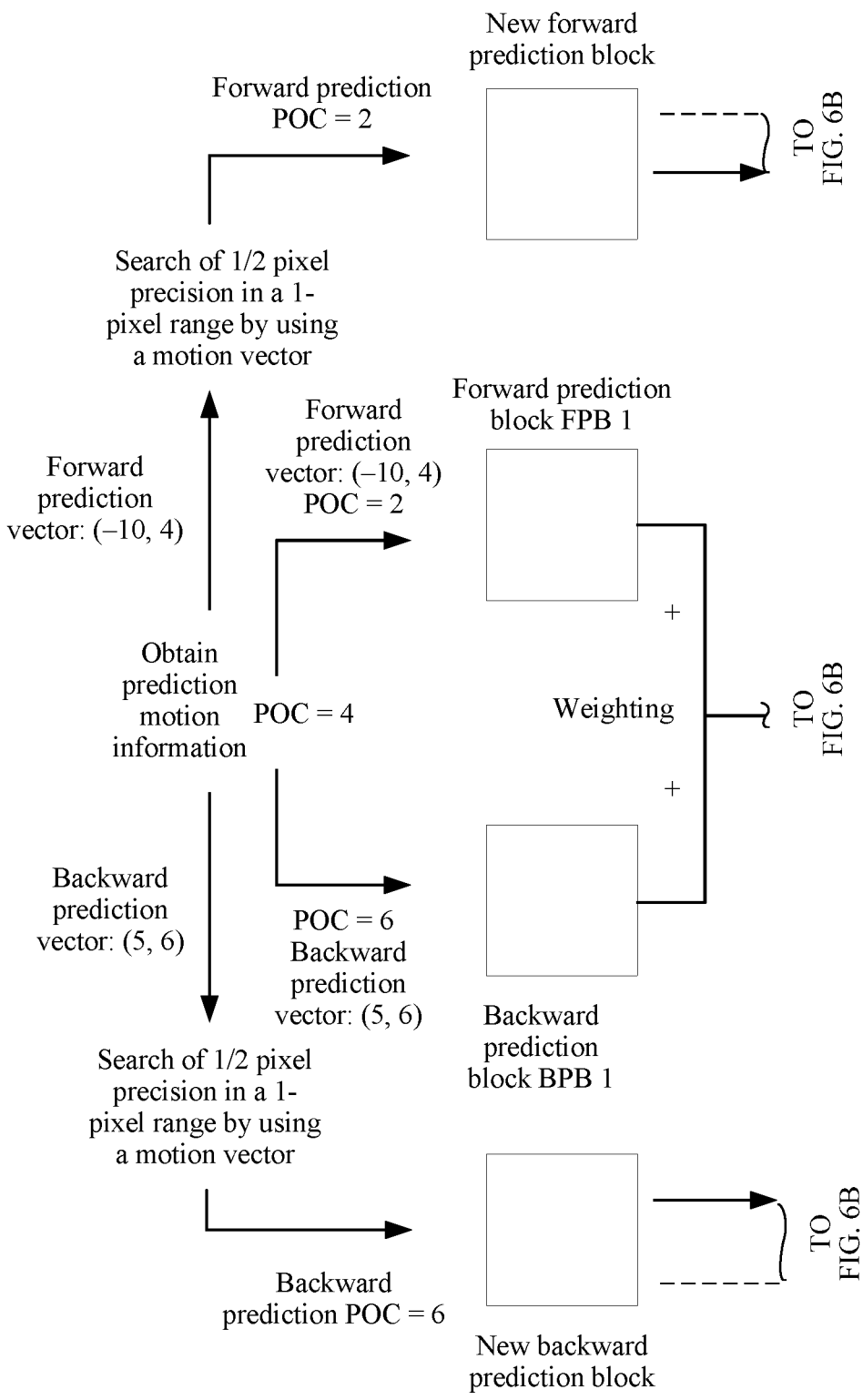
FIG. 6A, FIG. 6B, FIG. 7, FIG. 8A, FIG. 8B, FIG. 8C, FIG. 8D, FIG. 9A, and FIG. 9B are schematic diagrams of a process for image decoding through inter-prediction according to an embodiment of the present disclosure.
Figure 6B:
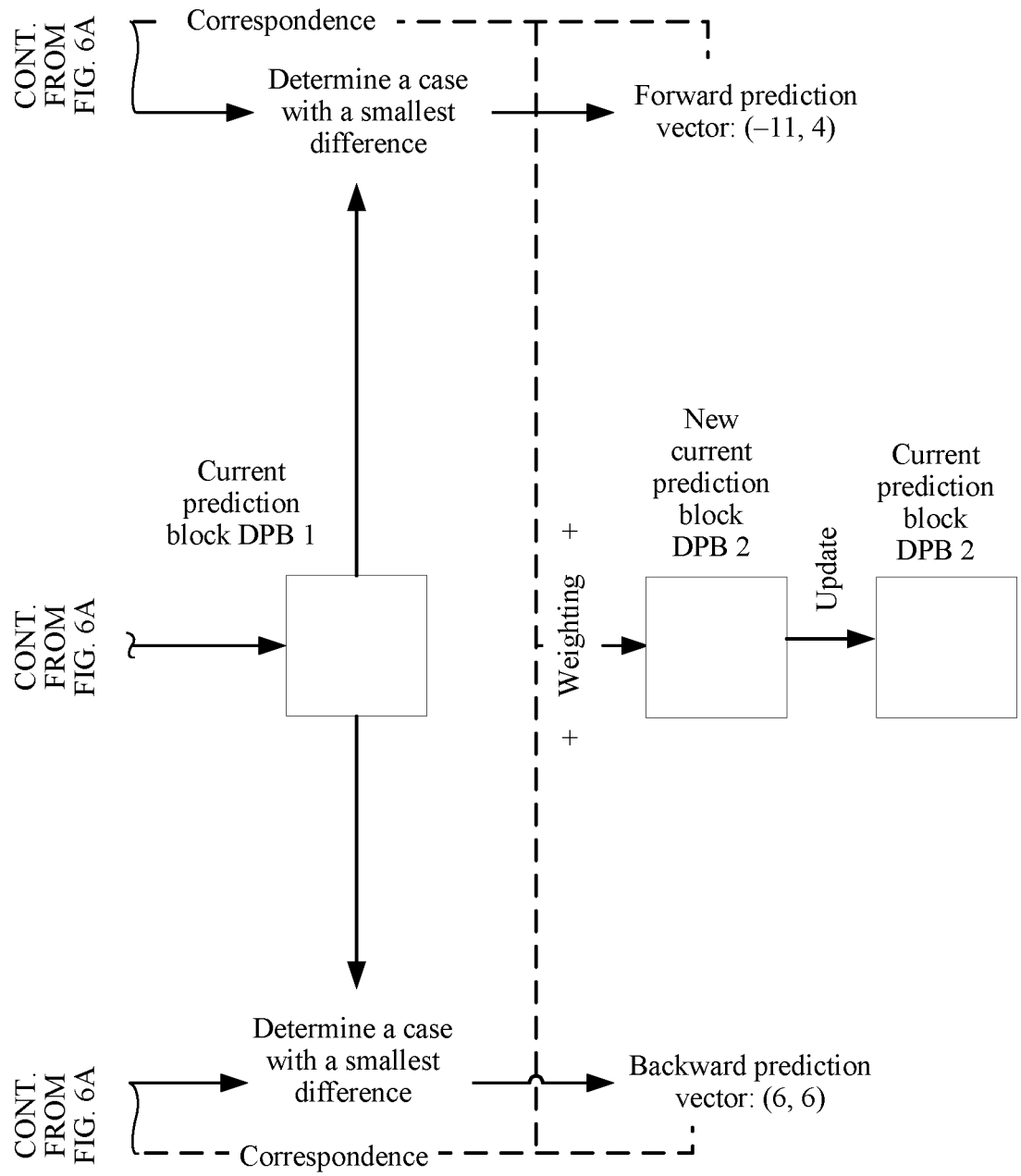

As shown in FIG. 6A and FIG. 6B, a current decoding block is a first decoding block, and prediction motion information of the current decoding block is obtained. It is assumed that forward and backward motion vector predictors of the current decoding block are respectively (−10, 4) and (5, 6), a POC corresponding to the current decoding block is 4, a POC corresponding to a forward prediction reference image block is 2, and a POC corresponding to a backward prediction reference image block is 6.

Forward prediction and backward prediction are separately performed on the current decoding block to obtain an initial forward decoding prediction block (FPB) and an initial backward decoding prediction block (BPB) of the current decoding block, and it is assumed that the initial forward decoding prediction block and the initial backward decoding prediction block are respectively an FPB 1 and a BPB 1. Weighted summation is performed on the FPB 1 and the BPB 1 to obtain a first decoding prediction block (DPB) of the current decoding block, and it is assumed that the first decoding prediction block is a DPB 1.

(−10, 4) and (5, 6) are used as reference input of the forward and backward motion vector predictors, and motion search of first precision is separately performed on the forward prediction reference image block and the backward prediction reference image block. In this case, the first precision is ½ pixel precision in a 1-pixel range. The first decoding prediction block DPB 1 is used as a reference. Differences between the first decoding prediction block DPB 1 and each of corresponding new forward and backward decoding prediction blocks found through the motion search are compared to obtain forward and backward motion vector predictors corresponding to a new decoding prediction block with a smallest difference from the DPB 1, to serve as target motion vector predictors. It is assumed that the forward and backward motion vector predictors are respectively (−11, 4) and (6, 6).

The target motion vector predictors are updated to (−11, 4) and (6, 6). In addition, forward prediction and backward prediction are performed on the first decoding block based on the target motion vector predictors, and weighted summation is performed on the obtained new forward decoding prediction block and backward decoding prediction block to obtain a target decoding prediction block. It is assumed that the target decoding prediction block is a DPB 2, and the decoding prediction block of the current decoding block is updated to the DPB 2.

It should be noted that, when motion search of the first precision is performed on the forward prediction reference image block and the backward prediction reference image block, the first precision may be any specified precision, for example, may be integer pixel precision, ½ pixel precision, ¼ pixel precision, or ⅛ pixel precision.

Embodiment 2

As shown in FIG. 6A and FIG. 6B, a current coding block is a first coding block, and prediction motion information of the current coding block is obtained. It is assumed that forward and backward motion vector predictors of the current coding block are respectively (−10, 4) and (5, 6), a POC corresponding to the current coding block is 4, a POC corresponding to a forward prediction reference image block is 2, and a POC corresponding to a backward prediction reference image block is 6.

Forward prediction and backward prediction are separately performed on the current coding block to obtain an initial forward coding prediction block or an initial backward coding prediction block of the current coding block, and it is assumed that the initial forward coding prediction block and the initial backward coding prediction block are respectively an FPB 1 and a BPB 1. Weighted summation is performed on the FPB 1 and the BPB 1 to obtain a first coding prediction block of the current coding block, and it is assumed that the first coding prediction block is a DPB 1.

(−10, 4) and (5, 6) are used as reference input of the forward and backward motion vector predictors, and motion search of first precision is separately performed on the forward prediction reference image block and the backward prediction reference image block. In this case, the first precision is ½ pixel precision in a 1-pixel range. The first coding prediction block DPB 1 is used as a reference. Differences between the first coding prediction block DPB 1 and each of corresponding new forward and backward coding prediction blocks found through the motion search are compared to obtain forward and backward motion vector predictors corresponding to a new coding prediction block with a smallest difference from the DPB 1, to serve as target motion vector predictors. It is assumed that the forward and backward motion vector predictors are respectively (−11, 4) and (6, 6).

The target motion vector predictors are updated to (−11, 4) and (6, 6). In addition, forward prediction and backward prediction are performed on the first coding block based on the target motion vector predictors, and weighted summation is performed on the obtained new forward coding prediction block and backward coding prediction block to obtain a target coding prediction block. It is assumed that the target coding prediction block is a DPB 2, and the coding prediction block of the current coding block is updated to the DPB 2.

It should be noted that, when motion search of the first precision is performed on the forward prediction reference image block and the backward prediction reference image block, the first precision may be any specified precision, for example, may be integer pixel precision, ½ pixel precision, ¼ pixel precision, or ⅛ pixel precision.

Embodiment 3

Figure 7:
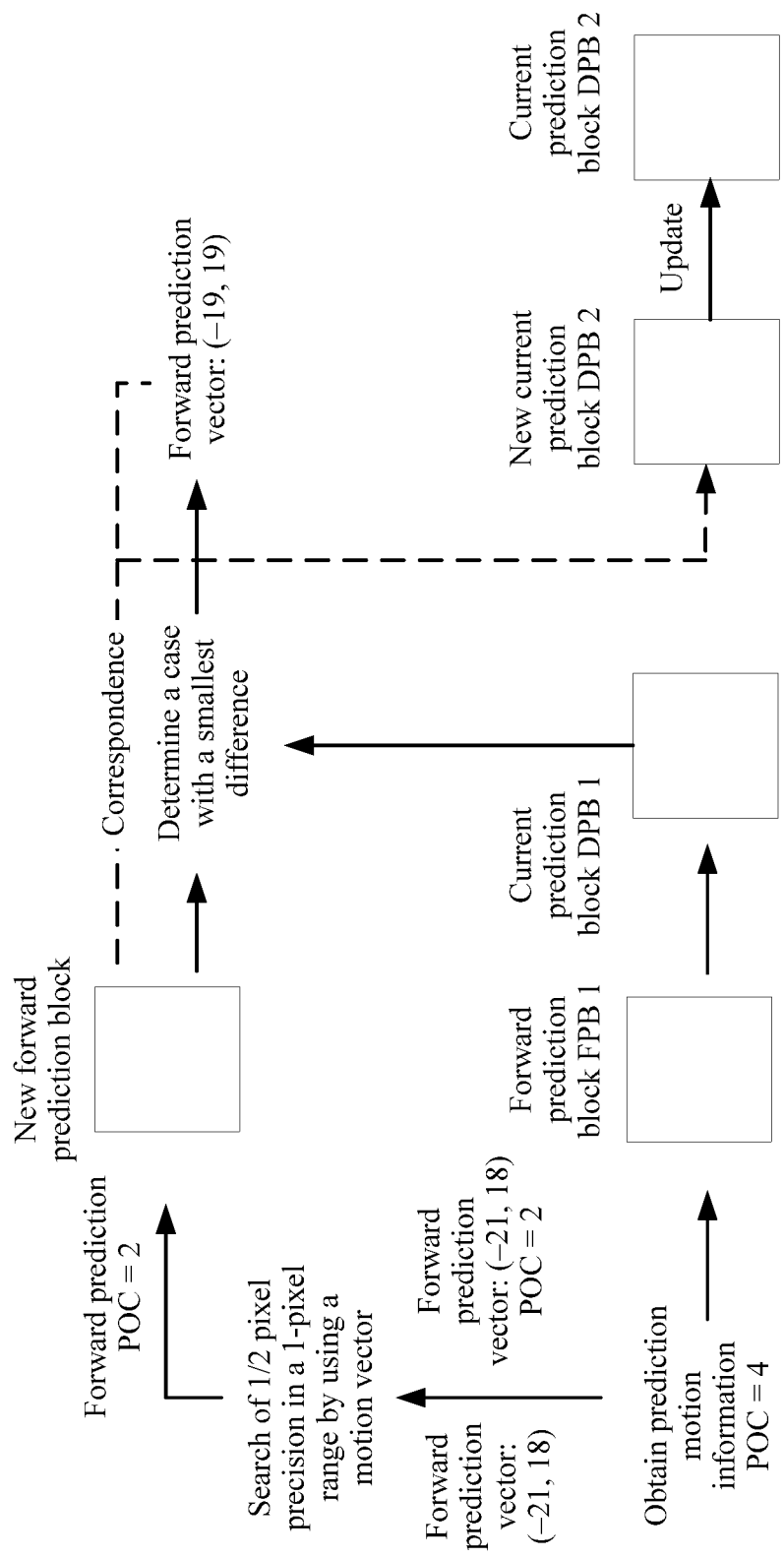
Figure 8A:
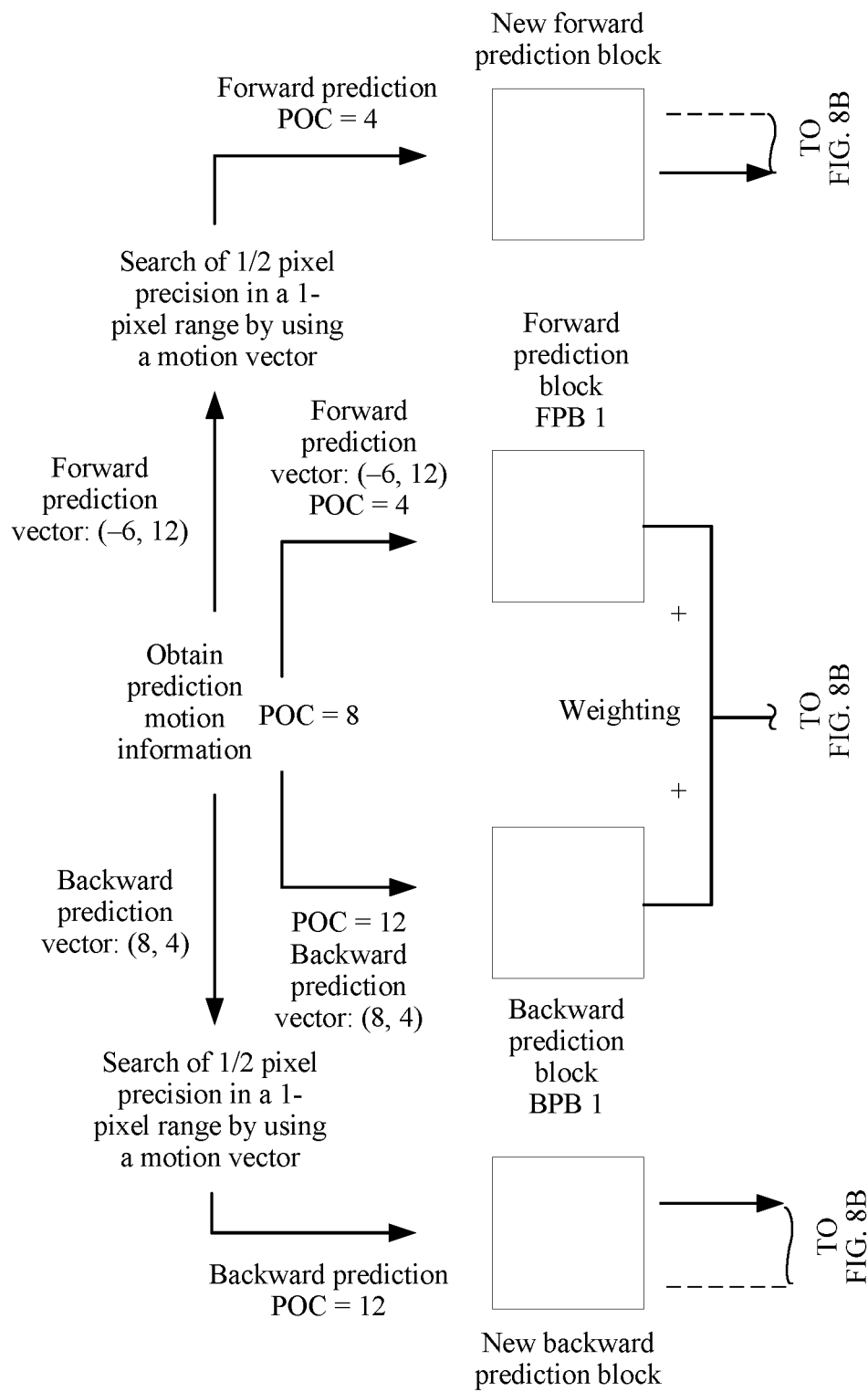
Figure 8B:
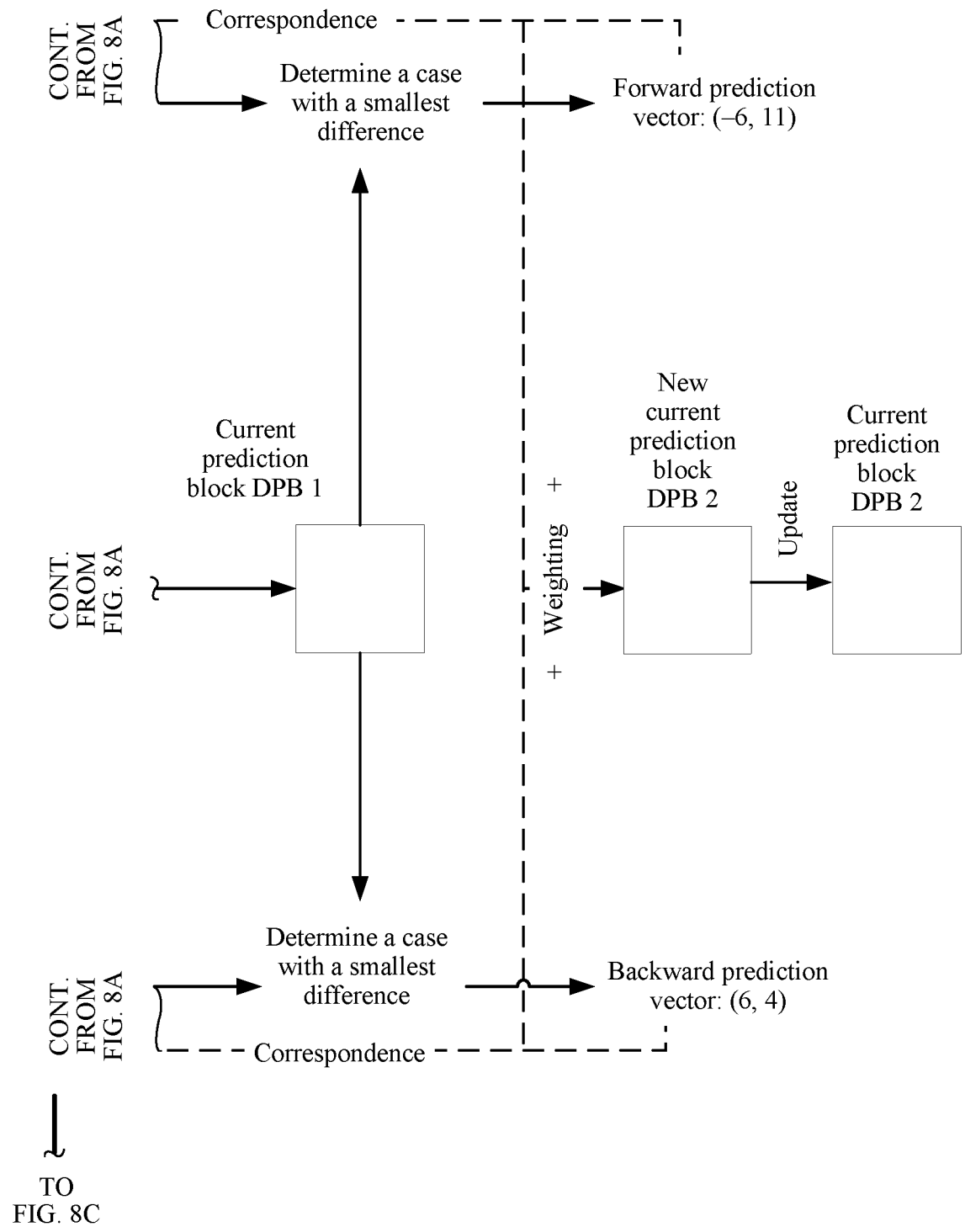
Figure 8C:
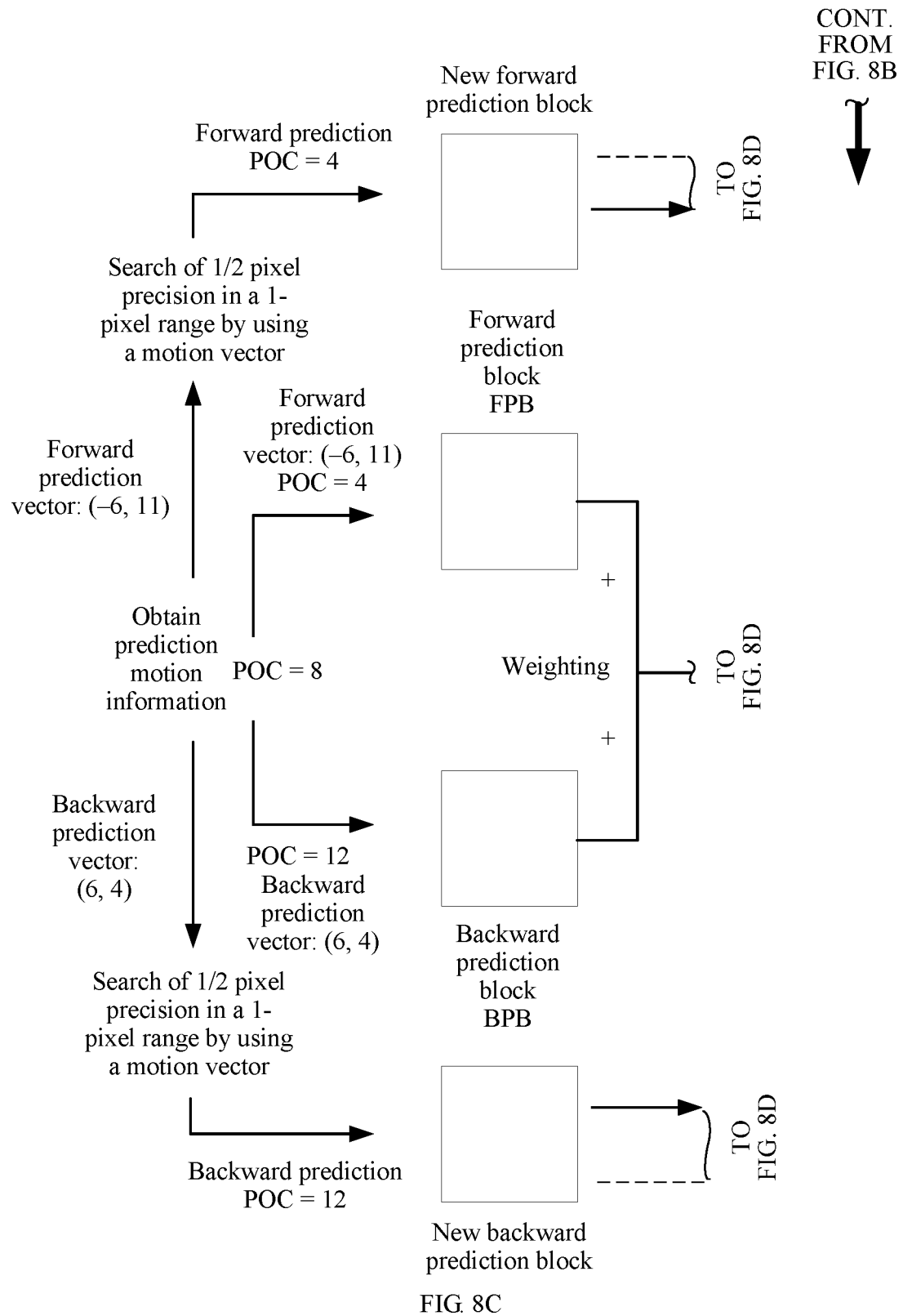
Figure 8D:
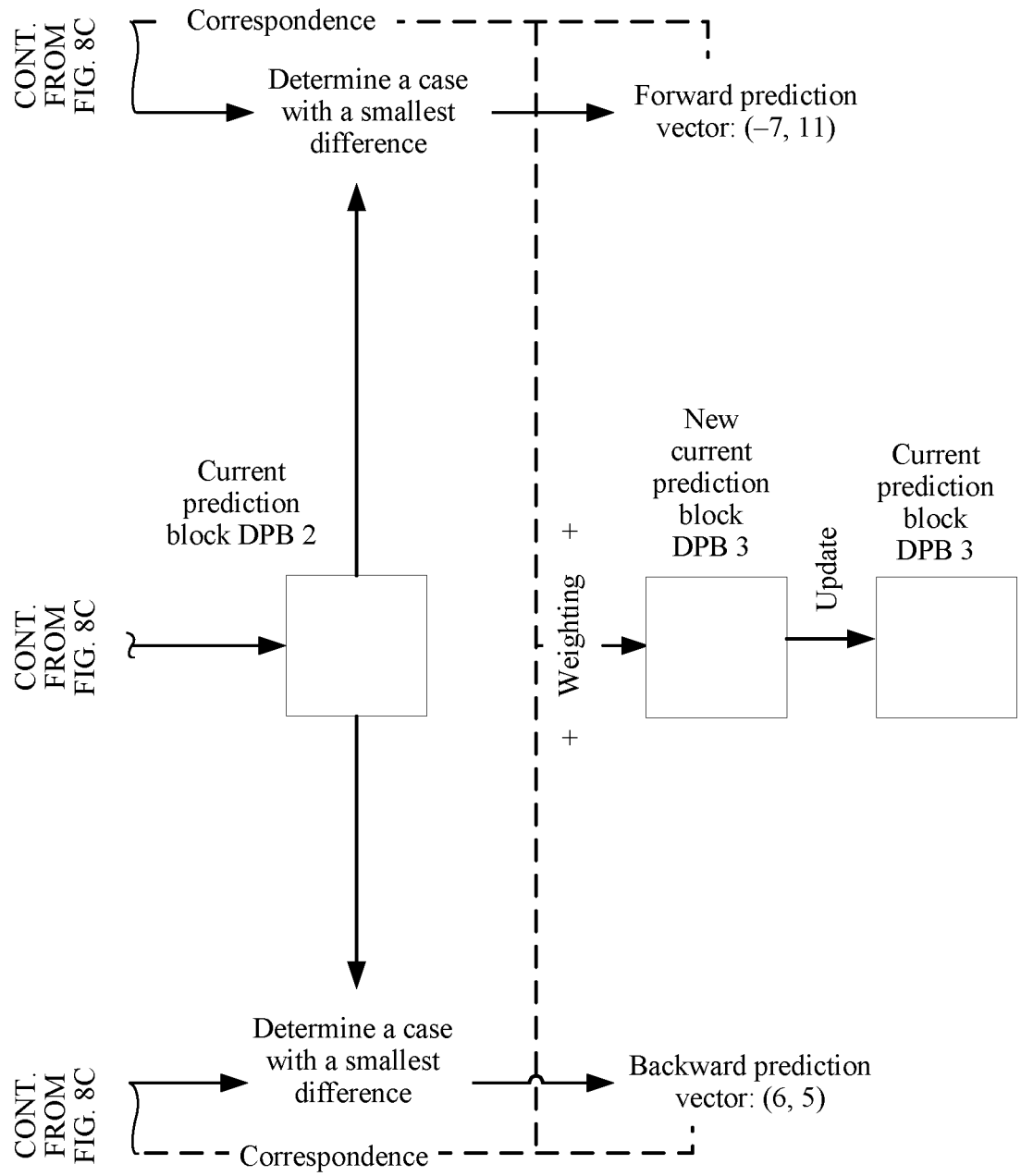

As shown in FIG. 7, a current decoding block is a first decoding block, and prediction motion information of the current decoding block is obtained. It is assumed that a forward motion vector predictor of the current decoding block is (−21, 18), a POC corresponding to the current decoding block is 4, and a POC corresponding to a forward prediction reference image block is 2.

Forward prediction is performed on the current decoding block to obtain an initial forward decoding prediction block of the current decoding block, and it is assumed that the initial forward decoding prediction block is an FPB 1. In this case, the FPB 1 is used as a first decoding prediction block of the current decoding block, and the first decoding prediction block is denoted as a DPB 1.

(−21, 18) is used as reference input of the forward motion vector predictor, and motion search of first precision is performed on the forward prediction reference image block. In this case, the first precision is 1 pixel precision in a 5-pixel range. The first decoding prediction block DPB 1 is used as a reference. Differences between the first decoding prediction block DPB 1 and corresponding new backward decoding prediction blocks found through the motion search are compared to obtain a forward motion vector predictor corresponding to a new decoding prediction block with a smallest difference from the DPB 1, to serve as a target motion vector predictor. It is assumed that the forward motion vector predictor is (−19, 19).

The target motion vector predictor is updated to (−19, 19). In addition, forward prediction is performed on the first decoding block based on the target motion vector predictor, and the obtained new forward decoding prediction block is used as a target decoding prediction block. It is assumed that the target decoding prediction block is a DPB 2, and the decoding prediction block of the current decoding block is updated to the DPB 2.

It should be noted that, when motion search of the first precision is performed on the forward prediction reference image block and a backward prediction reference image block, the first precision may be any specified precision, for example, may be integer pixel precision, ½ pixel precision, ¼ pixel precision, or ⅛ pixel precision.

Embodiment 4

As shown in FIG. 7, a current coding block is a first coding block, and prediction motion information of the current coding block is obtained. It is assumed a forward motion vector predictor of the current coding block is (−21, 18), a POC corresponding to the current coding block is 4, and a POC corresponding to a forward prediction reference image block is 2.

Forward prediction is performed on the current coding block to obtain an initial forward coding prediction block of the current coding block, and it is assumed that the initial forward coding prediction block is an FPB 1. In this case, the FPB 1 is used as a first coding prediction block of the current coding block, and the first coding prediction block is denoted as a DPB 1.

(−21, 18) is used as reference input of the forward motion vector predictor, and motion search of first precision is performed on the forward prediction reference image block. In this case, the first precision is 1 pixel precision in a 5-pixel range. The first coding prediction block DPB 1 is used as a reference. Differences between the first coding prediction block DPB 1 and corresponding new backward coding prediction blocks found through the motion search are compared to obtain a forward motion vector predictor corresponding to a new coding prediction block with a smallest difference from the DPB 1, to serve as a target motion vector predictor. It is assumed that the forward motion vector predictor is (−19, 19).

The target motion vector predictor is updated to (−19, 19). In addition, forward prediction is performed on the first coding block based on the target motion vector predictor, and the obtained new forward coding prediction block is used as a target coding prediction block. It is assumed that the target coding prediction block is a DPB 2, and the coding prediction block of the current coding block is updated to the DPB 2.

It should be noted that, when motion search of the first precision is performed on the forward prediction reference image block and a backward prediction reference image block, the first precision may be any specified precision, for example, may be integer pixel precision, ½ pixel precision, ¼ pixel precision, or ⅛ pixel precision.

Embodiment 5

As shown in FIG. 8A, FIG. 8B, FIG. 8C, and FIG. 8D, a current coding block is a first coding block, and prediction motion information of the current coding block is obtained. It is assumed that forward and backward motion vector predictors of the current coding block are respectively (−6, 12) and (8, 4), a POC corresponding to the current coding block is 8, a POC corresponding to a forward prediction reference image block is 4, and a POC corresponding to a backward prediction reference image block is 12.

Forward prediction and backward prediction are separately performed on the current coding block to obtain an initial forward coding prediction block or an initial backward coding prediction block of the current coding block, and it is assumed that the initial forward coding prediction block and the initial backward coding prediction block are respectively an FPB 1 and a BPB 1. Weighted summation is performed on the FPB 1 and the BPB 1 to obtain a first coding prediction block of the current coding block, and it is assumed that the first coding prediction block is a DPB 1.

(−6, 12) and (8, 4) are used as reference input of the forward and backward motion vector predictors, and motion search of first precision is separately performed on the forward prediction reference image block and the backward prediction reference image block. The first coding prediction block DPB 1 is used as a reference. Differences between the first coding prediction block DPB 1 and each of corresponding new forward and backward coding prediction blocks found through the motion search are compared to obtain forward and backward motion vector predictors corresponding to a new coding prediction block with a smallest difference from the DPB 1, to serve as target motion vector predictors. It is assumed that the forward and backward motion vector predictors are respectively (−11, 4) and (6, 6).

The target motion vector predictors are updated to (−11, 4) and (6, 6). In addition, forward prediction and backward prediction are performed on the first coding block based on the target motion vector predictors, and weighted summation is performed on the obtained new forward coding prediction block and backward coding prediction block to obtain a target coding prediction block. It is assumed that the target coding prediction block is a DPB 2, and the coding prediction block of the current coding block is updated to the DPB 2.

Subsequently, (−11, 4) and (6, 6) are used as reference input of the forward and backward motion vector predictors, and motion search of the first precision is separately performed on the forward prediction reference image block and the backward prediction reference image block. The coding prediction block DPB 2 of the current coding block is used as a reference. Differences between the first coding prediction block DPB 2 and each of corresponding new forward and backward coding prediction blocks found through the motion search are compared to obtain forward and backward motion vector predictors corresponding to a new coding prediction block with a smallest difference from the DPB 2, to serve as new target motion vector predictors. It is assumed that the forward and backward motion vector predictors are respectively (−7, 11) and (6, 5).

Subsequently, the target motion vector predictors are updated to (−7, 11) and (6, 5). In addition, forward prediction and backward prediction are performed on the first coding block based on the latest target motion vector predictors, and weighted summation is performed on the obtained new forward coding prediction block and backward coding prediction block to obtain a target coding prediction block. It is assumed that the target coding prediction block is a DPB 3, and the coding prediction block of the current coding block is updated to the DPB 3.

Further, the target motion vector predictor may be subsequently updated according to the foregoing method such that a quantity of repetitions is not limited.

It should be noted that, when motion search of the first precision is performed on the forward prediction reference image block and the backward prediction reference image block, the first precision may be any specified precision, for example, may be integer pixel precision, ½ pixel precision, ¼ pixel precision, or ⅛ pixel precision.

Embodiment 6

In this embodiment, a manner of obtaining a motion vector predictor in a coding process of a non-merge mode of inter-prediction is different from that in the foregoing embodiments. Embodiment 6 describes in detail a decoding process of the non-merge mode of inter-prediction. Similarly, the coding process and the decoding process are similar in the non-merge mode of inter-prediction, and details are not described herein again.

Figure 9A:
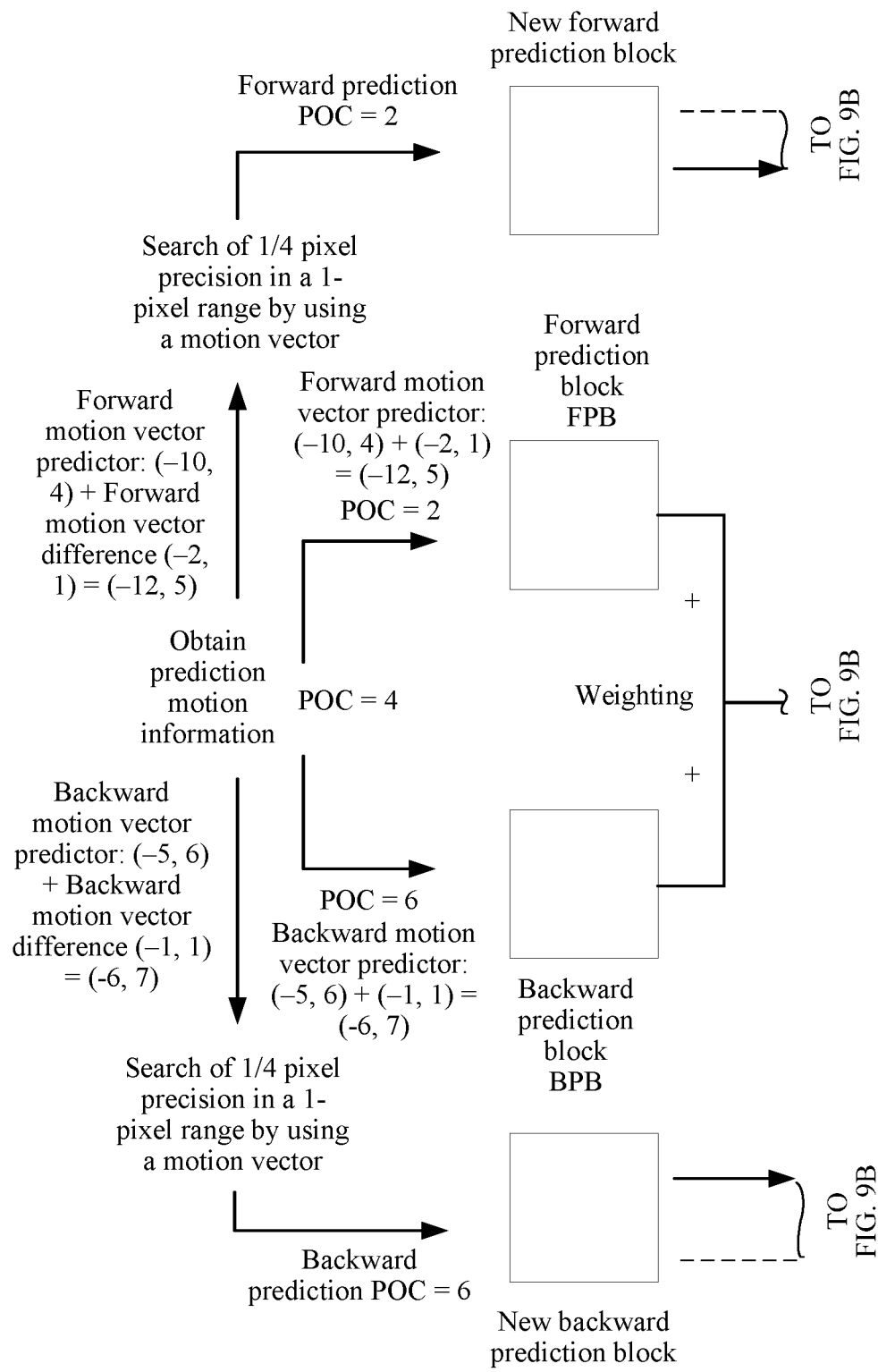
Figure 9B:
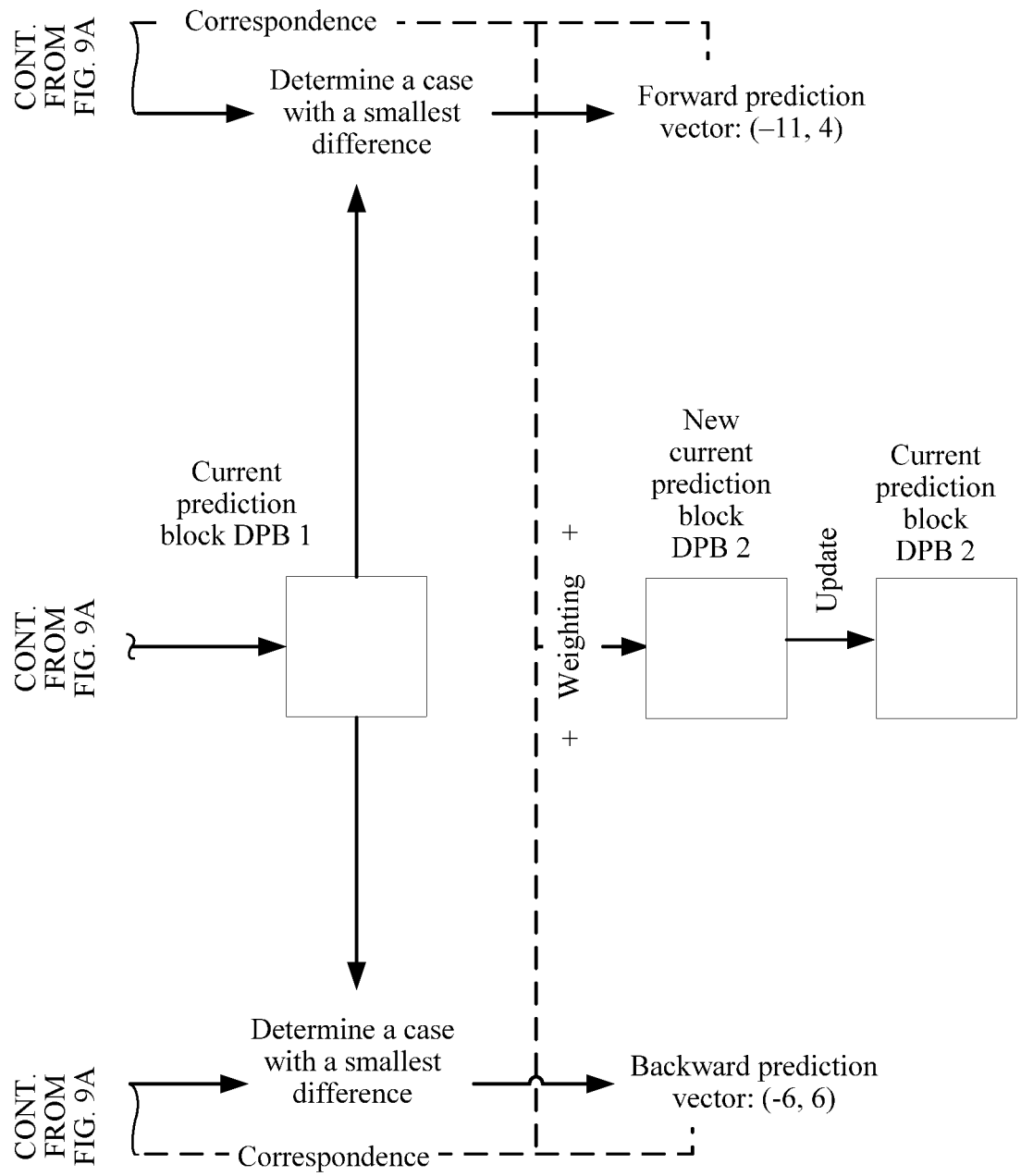

As shown in FIG. 9A and FIG. 9B, a current decoding block is a first decoding block, and prediction motion information of the current decoding block is obtained. It is assumed that forward and backward motion vector values of the current decoding block are respectively (−10, 4) and (5, 6), forward and backward motion vector differences are respectively (−2, 1) and (1, 1), a POC corresponding to the current decoding block is 4, a POC corresponding to a forward prediction reference image block is 2, and a POC corresponding to a backward prediction reference image block is 6.

Forward prediction and backward prediction are separately performed on the current decoding block to obtain an initial FPB and an initial BPB of the current decoding block, and it is assumed that the initial forward decoding prediction block and the initial backward decoding prediction block are respectively an FPB 1 and a BPB 1. Weighted summation is performed on the FPB 1 and the BPB 1 to obtain a first decoding prediction block (DPB) of the current decoding block, and it is assumed that the first decoding prediction block is a DPB 1.

Forward and backward motion vector predictors (−10, 4)+(−2, 1)=(−12, 5) and (5, 6)+(1, 1)=(6, 7) are used as reference input of the forward and backward motion vectors, and motion search of first precision is separately performed on the forward prediction reference image block and the backward prediction reference image block. In this case, the first precision is ¼ pixel precision in a 1-pixel range. The first decoding prediction block DPB 1 is used as a reference. Differences between the first decoding prediction block DPB 1 and each of corresponding new forward and backward decoding prediction blocks found through the motion search are compared to obtain forward and backward motion vectors corresponding to a new decoding prediction block with a smallest difference from the DPB 1, to serve as target motion vector predictors. It is assumed that the forward and backward motion vectors are respectively (−11, 4) and (6, 6).

The target motion vector predictors are updated to (−11, 4) and (6, 6). In addition, forward prediction and backward prediction are performed on the first decoding block based on the target motion vector predictors, and weighted summation is performed on the obtained new forward decoding prediction block and backward decoding prediction block to obtain a target decoding prediction block. It is assumed that the target decoding prediction block is a DPB 2, and the decoding prediction block of the current decoding block is updated to the DPB 2.

It should be noted that, when motion search of the first precision is performed on the forward prediction reference image block and the backward prediction reference image block, the first precision may be any specified precision, for example, may be integer pixel precision, ½ pixel precision, ¼ pixel precision, or ⅛ pixel precision.

In conclusion, the foregoing coding and decoding methods may be applied to all bidirectional prediction processes in video image coding and decoding, and an updated motion vector predictor and coding and decoding prediction blocks may be applied to all video image coding and decoding processes. A codec system obtains current coding and decoding prediction blocks based on prediction motion information of current coding and decoding blocks, performs motion search based on a motion vector predictor and a prediction reference image block to obtain new coding and decoding prediction blocks, and updates the motion vector predictor and the coding and decoding prediction blocks of the current coding and decoding blocks through difference comparison with current coding and decoding prediction blocks to improve motion precision.

Figure 10:
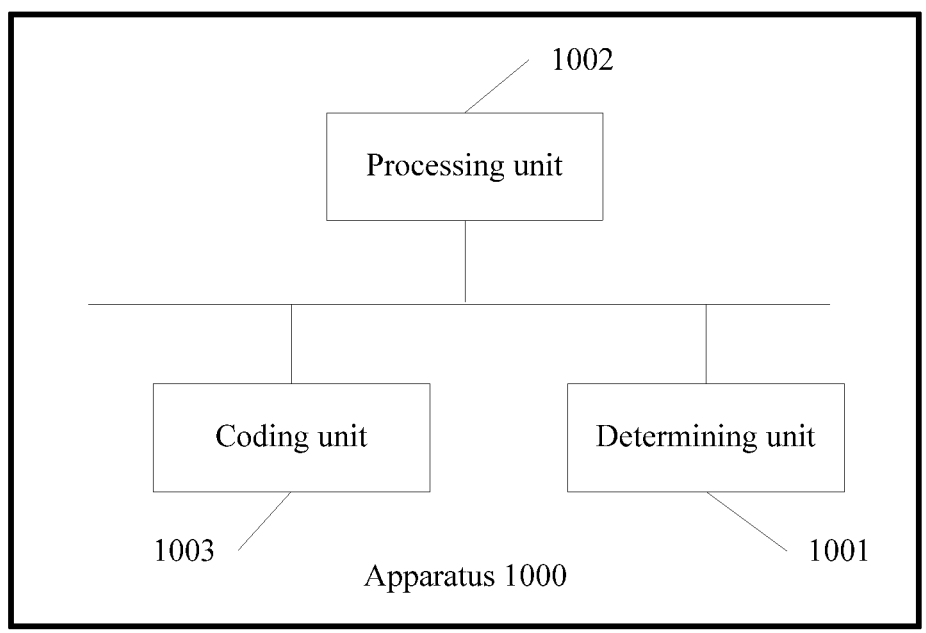
FIG. 10 is a structural diagram of an apparatus for image coding through inter-prediction according to an embodiment of the present disclosure.

According to the foregoing embodiments, as shown in FIG. 10, an embodiment of the present disclosure provides an apparatus 1000 for image coding through inter-prediction. As shown in FIG. 10, the apparatus 1000 includes a determining unit 1001, a processing unit 1002, and a coding unit 1003.

The determining unit 1001 is configured to determine prediction motion information of a first coding block, where the prediction motion information includes a motion vector predictor and prediction reference image information, and the prediction reference image information is used to represent a prediction reference image block.

The processing unit 1002 is configured to perform bidirectional prediction on the first coding block based on the prediction motion information to obtain an initial coding prediction block of the first coding block, and obtain a first coding prediction block of the first coding block based on the initial coding prediction block, perform motion search of first precision on the prediction reference image block to obtain at least one second coding prediction block, where a search location of the motion search is determined using the motion vector predictor and the first precision, calculate a difference between the first coding prediction block and each second coding prediction block, and use a motion vector predictor between the first coding block and a second coding prediction block with a smallest difference as a target motion vector predictor of the first coding block, and perform bidirectional prediction on the first coding block based on the target motion vector predictor to obtain a third coding prediction block of the first coding block.

The coding unit 1003 is configured to obtain a target coding prediction block of the first coding block based on the third coding prediction block, and code the first coding block based on the target coding prediction block.

Optionally, the prediction motion information includes forward prediction motion information or backward prediction motion information, the motion vector predictor includes a forward motion vector predictor or a backward motion vector predictor, and the prediction reference image block includes a forward prediction reference image block or a backward prediction reference image block.

Optionally, the initial coding prediction block includes an initial forward coding prediction block or an initial backward coding prediction block, and when performing bidirectional prediction on the first coding block based on the prediction motion information to obtain the initial coding prediction block of the first coding block, the processing unit 1002 is configured to perform forward prediction on the first coding block based on the forward prediction motion information to obtain the initial forward coding prediction block of the first coding block, or perform backward prediction on the first coding block based on the backward prediction motion information to obtain the initial backward coding prediction block of the first coding block.

Optionally, when obtaining the first coding prediction block of the first coding block based on the initial coding prediction block, the processing unit 1002 is configured to perform weighted summation on the initial forward coding prediction block and the initial backward coding prediction block to obtain the first coding prediction block of the first coding block, or use the initial forward coding prediction block as the first coding prediction block of the first coding block, or use the initial backward coding prediction block as the first coding prediction block of the first coding block.

Optionally, the second coding prediction block includes a forward second coding prediction block or a backward second coding prediction block, and when performing motion search of the first precision on the prediction reference image block based on the motion vector predictor to obtain the at least one second coding prediction block, the processing unit 1002 is configured to perform motion search of the first precision on the forward prediction reference image block based on the forward motion vector predictor, and use each found forward coding prediction block as the forward second coding prediction block to obtain the at least one second coding prediction block, or perform motion search of the first precision on the backward prediction reference image block based on the backward motion vector predictor, and use each found backward coding prediction block as the backward second coding prediction block to obtain the at least one second coding prediction block.

The first precision includes integer pixel precision, ½ pixel precision, ¼ pixel precision, or ⅛ pixel precision.

Optionally, the target motion vector predictor includes a target forward motion vector predictor or a target backward motion vector predictor, and when calculating the difference between the first coding prediction block and each second coding prediction block, and using the motion vector predictor between the first coding block and the second coding prediction block with a smallest difference as the target motion vector predictor of the first coding block, the processing unit 1002 is configured to compare differences between the forward second coding prediction blocks and the first coding prediction block, and use a target forward motion vector predictor between the first coding block and a forward second coding prediction block with a smallest difference as the target motion vector predictor, or compare differences between the backward second coding prediction blocks and the first coding prediction block, and use a target backward motion vector predictor between the first coding block and a backward second coding prediction block with a smallest difference as the target motion vector predictor.

Optionally, the third coding prediction block of the first coding block includes a forward third coding prediction block or a backward third coding prediction block, and when performing bidirectional prediction on the first coding block based on the target motion vector predictor to obtain the third coding prediction block of the first coding block, the processing unit 1002 is configured to perform forward prediction on the first coding block based on the target forward motion vector predictor to obtain the forward third coding prediction block of the first coding block, or perform backward prediction on the first coding block based on the target backward motion vector predictor to obtain the backward third coding prediction block of the first coding block.

Optionally, when obtaining the target coding prediction block of the first coding block based on the third coding prediction block, the processing unit 1002 is configured to perform weighted summation on the forward third coding prediction block and the backward third coding prediction block to obtain the target coding prediction block of the first coding block, or use the forward third coding prediction block as the target coding prediction block of the first coding block, or use the backward third coding prediction block as the target coding prediction block of the first coding block.

It should be noted that, for function implementation and an interaction manner of each unit of the apparatus 1000 in this embodiment of the present disclosure, further refer to descriptions in a related method embodiment. Details are not described herein again.

Figure 11:
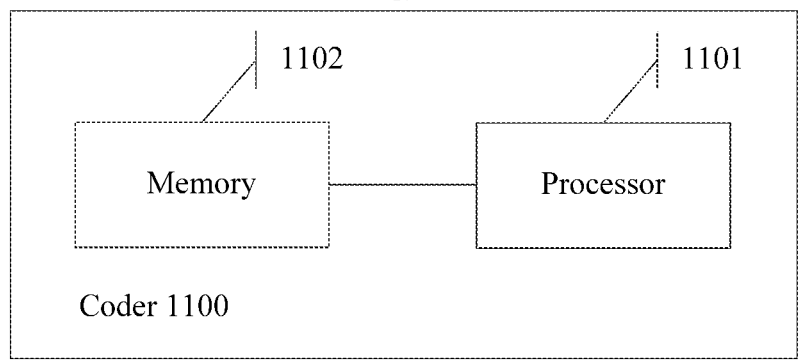
FIG. 11 is a structural diagram of an image coder using inter-prediction according to an embodiment of the present disclosure.

According to a same disclosure concept, as shown in FIG. 11, an embodiment of the present disclosure further provides a coder 1100. As shown in FIG. 11, the coder 1100 includes a processor 1101 and a memory 1102. Program code used to execute the solutions of the present disclosure is stored in the memory 1102, and is used to instruct the processor 1101 to perform the coding method shown in FIG. 4.

Code corresponding to the method shown in FIG. 4 may also be built into a chip by performing design programming for the processor such that when the chip runs, the method shown in FIG. 4 can be performed.

Figure 12:
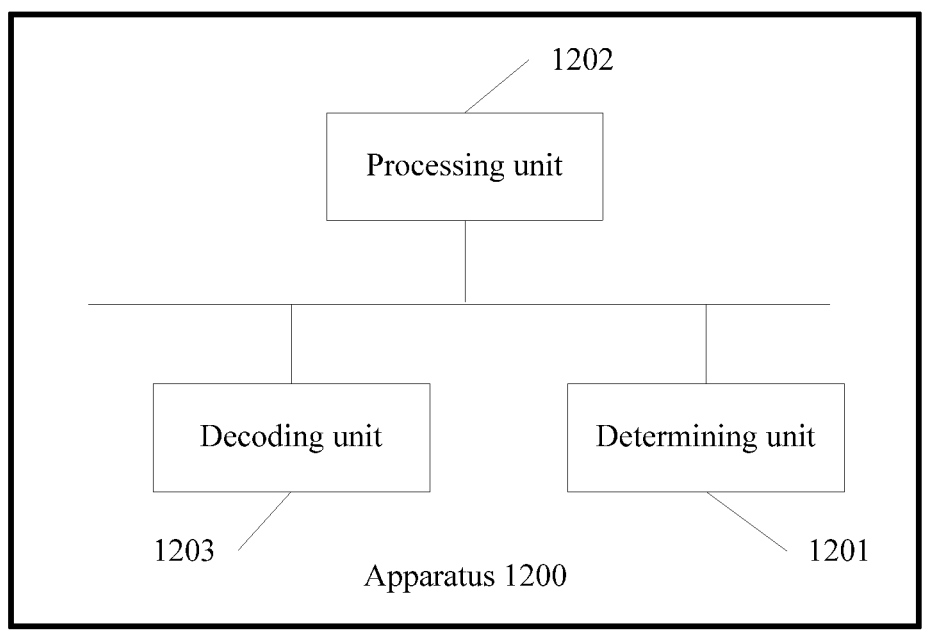
FIG. 12 is a structural diagram of an apparatus for image decoding through inter-prediction according to an embodiment of the present disclosure.

According to the foregoing embodiments, as shown in FIG. 12, an embodiment of the present disclosure provides an apparatus 1200 for image decoding through inter-prediction. As shown in FIG. 12, the apparatus 1200 includes a determining unit 1201, a processing unit 1202, and a decoding unit 1203.

The determining unit 1201 is configured to determine prediction motion information of a first decoding block, where the prediction motion information includes a motion vector predictor and prediction reference image information, and the prediction reference image information is used to represent a prediction reference image block.

The processing unit 1202 is configured to perform bidirectional prediction on the first decoding block based on the prediction motion information to obtain an initial decoding prediction block of the first decoding block, and obtain a first decoding prediction block of the first decoding block based on the initial decoding prediction block, perform motion search of first precision on the prediction reference image block to obtain at least one second decoding prediction block, where a search location of the motion search is determined using the motion vector predictor and the first precision, calculate a difference between the first decoding prediction block and each second decoding prediction block, and use a motion vector predictor between the first decoding block and a second decoding prediction block with a smallest difference as a target motion vector predictor of the first decoding block, and perform bidirectional prediction on the first decoding block based on the target motion vector predictor to obtain a third decoding prediction block of the first decoding block.

The decoding unit 1203 is configured to obtain a target decoding prediction block of the first decoding block based on the third decoding prediction block, and decode the first decoding block based on the target decoding prediction block.

Optionally, the prediction motion information includes forward prediction motion information or backward prediction motion information, the motion vector predictor includes a forward motion vector predictor or a backward motion vector predictor, and the prediction reference image block includes a forward prediction reference image block or a backward prediction reference image block.

Optionally, the initial decoding prediction block includes an initial forward decoding prediction block or an initial backward decoding prediction block, and when performing bidirectional prediction on the first decoding block based on the prediction motion information to obtain the initial decoding prediction block of the first decoding block, the processing unit 1202 is configured to perform forward prediction on the first decoding block based on the forward prediction motion information to obtain the initial forward decoding prediction block of the first decoding block, or perform backward prediction on the first decoding block based on the backward prediction motion information to obtain the initial backward decoding prediction block of the first decoding block.

Optionally, when obtaining the first decoding prediction block of the first decoding block based on the initial decoding prediction block, the processing unit 1202 is configured to perform weighted summation on the initial forward decoding prediction block and the initial backward decoding prediction block to obtain the first decoding prediction block of the first decoding block, or use the initial forward decoding prediction block as the first decoding prediction block of the first decoding block, or use the initial backward decoding prediction block as the first decoding prediction block of the first decoding block.

Optionally, the second decoding prediction block includes a forward second decoding prediction block or a backward second decoding prediction block, and when performing motion search of the first precision on the prediction reference image block based on the motion vector predictor to obtain the at least one second decoding prediction block, the processing unit 1202 is configured to perform motion search of the first precision on the forward prediction reference image block based on the forward motion vector predictor, and use each found forward decoding prediction block as the forward second decoding prediction block to obtain the at least one second decoding prediction block, or perform motion search of the first precision on the backward prediction reference image block based on the backward motion vector predictor, and use each found backward decoding prediction block as the backward second decoding prediction block to obtain the at least one second decoding prediction block.

The first precision includes integer pixel precision, ½ pixel precision, ¼ pixel precision, or ⅛ pixel precision.

Optionally, the target motion vector predictor includes a target forward motion vector predictor or a target backward motion vector predictor, and when calculating the difference between the first decoding prediction block and each second decoding prediction block, and using the motion vector predictor between the first decoding block and the second decoding prediction block with a smallest difference as the target motion vector predictor of the first decoding block, the processing unit 1202 is configured to compare differences between the forward second decoding prediction blocks and the first decoding prediction block, and use a target forward motion vector predictor between the first decoding block and a forward second decoding prediction block with a smallest difference as the target motion vector predictor, or compare differences between the backward second decoding prediction blocks and the first decoding prediction block, and use a target backward motion vector predictor between the first decoding block and a backward second decoding prediction block with a smallest difference as the target motion vector predictor.

Optionally, the third decoding prediction block of the first decoding block includes a forward third decoding prediction block or a backward third decoding prediction block, and when performing bidirectional prediction on the first decoding block based on the target motion vector predictor to obtain the third decoding prediction block of the first decoding block, the processing unit 1202 is configured to perform forward prediction on the first decoding block based on the target forward motion vector predictor to obtain the forward third decoding prediction block of the first decoding block, or perform backward prediction on the first decoding block based on the target backward motion vector predictor to obtain the backward third decoding prediction block of the first decoding block.

Optionally, when obtaining the target decoding prediction block of the first decoding block based on the third decoding prediction block, the processing unit 1202 is configured to perform weighted summation on the forward third decoding prediction block and the backward third decoding prediction block to obtain the target decoding prediction block of the first decoding block, or use the forward third decoding prediction block as the target decoding prediction block of the first decoding block, or use the backward third decoding prediction block as the target decoding prediction block of the first decoding block.

It should be noted that, for function implementation and an interaction manner of each unit of the apparatus 1200 in this embodiment of the present disclosure, further refer to descriptions in a related method embodiment. Details are not described herein again.

It should be understood that division of the units in the apparatus 1200 and the apparatus 1000 is merely logical function division. In an actual implementation, all or some of the units may be integrated into one physical entity, or the units may be physically separated. For example, the foregoing units may be separately disposed processing elements, or may be integrated into a chip of a controller for implementation, or may be stored in a memory element of a controller in a form of program code and invoked by a processing element of the controller to implement functions of the foregoing units. In addition, the units may be integrated or may be implemented separately. The processing element may be an integrated circuit chip and has a signal processing capability. In an implementation process, steps in the foregoing methods or the foregoing units can be implemented using a hardware integrated logic circuit in the processing element, or using instructions in a form of software. The processing element may be a general purpose processor, such as a central processing unit (CPU), or may be configured as one or more integrated circuits that perform the foregoing methods, such as one or more disclosure-specific integrated circuits (ASIC), one or more digital signal processors (DSP), or one or more field-programmable gate arrays (FPGA).

Figure 13:
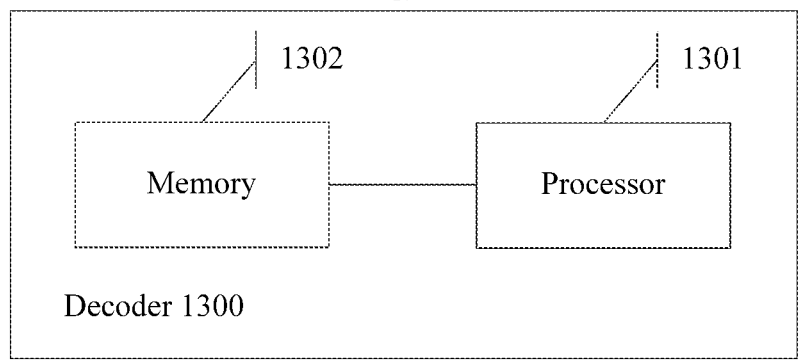
FIG. 13 is a structural diagram of an image decoder using inter-prediction according to an embodiment of the present disclosure.

According to a same disclosure concept, an embodiment of the present disclosure further provides a decoder 1300. As shown in FIG. 13, the decoder 1300 includes a processor 1301 and a memory 1302. Program code used to execute the solutions of the present disclosure is stored in the memory 1302, and is used to instruct the processor 1301 to perform the decoding method shown in FIG. 5.

Code corresponding to the method shown in FIG. 5 may also be built into a chip by performing design programming for the processor such that when the chip runs, the method shown in FIG. 5 can be performed.

It can be understood that, the processor in the coder 1100 and the decoder 1300 in the embodiments of the present disclosure may be a CPU, a DSP, an ASIC, or one or more integrated circuits configured to control program execution in the solutions of the present disclosure. One or more memories included in a computer system may be a read-only memory (ROM) or another type of static storage device that is capable of storing static information and a static instruction, a random access memory (RAM) or another type of dynamic storage device that is capable of storing information and an instruction, or may be a magnetic disk memory. These memories are connected to the processor using a bus, or may be connected to the processor using a dedicated connection cable.

A person of ordinary skill in the art may understand that all or some of the steps in the foregoing methods of the embodiments may be implemented by a program instructing a processor. The foregoing program may be stored in a computer readable storage medium. The storage medium is a non-transitory medium, such as a random access memory, a read-only memory, a flash memory, a hard disk, a solid state drive, a magnetic tape, a floppy disk, an optical disc, or any combination thereof.

The present disclosure is described with reference to respective flowcharts and block diagrams of the methods and the devices in the embodiments of the present disclosure. It should be understood that computer program instructions may be used to implement each process and each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts or in one or more blocks in the block diagrams.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for image coding through inter-prediction, comprising:
    determining prediction motion information of a first coding block, wherein the prediction motion information comprises a motion vector predictor and prediction reference image information used to represent a prediction reference image block;
    performing bidirectional prediction on the first coding block based on the prediction motion information to obtain an initial coding prediction block of the first coding block, wherein the initial coding prediction block comprises at least one of an initial forward coding prediction block obtained based on forward prediction of the first coding block or an initial backward coding prediction block obtained based on backward prediction of the first coding block;
    obtaining a first coding prediction block of the first coding block using at least one of the initial forward coding prediction block or the initial backward coding prediction block;
    performing a bidirectional motion search of a first precision on the prediction reference image block to obtain at least one second coding prediction block, wherein a search location of the motion search is based on the motion vector predictor and the first precision;
    calculating a difference between the first coding prediction block and each second coding prediction block;
    using a smallest motion vector predictor between the first coding block and a second coding prediction block with a smallest difference as a target motion vector predictor of the first coding block;
    performing bidirectional prediction on the first coding block based on the target motion vector predictor to obtain a third coding prediction block of the first coding block;
    obtaining a target coding prediction block of the first coding block based on the third coding prediction block; and
    coding the first coding block based on the target coding prediction block.

2. The method according tool claim 1, wherein the prediction motion information comprises forward prediction motion information, the motion vector predictor comprises a forward motion vector predictor, and the prediction reference image block comprises a forward prediction reference image block, wherein the initial coding prediction block comprises the initial forward coding prediction block, and wherein performing bidirectional prediction on the first coding block based on the prediction motion information to obtain the initial coding prediction block of the first coding block comprises performing forward prediction on the first coding block based on the forward prediction motion information to obtain the initial forward coding prediction block of the first coding block.

3. The method of to claim 1, wherein the prediction motion information comprises backward prediction motion information, the motion vector predictor comprises a backward motion vector predictor, and the prediction reference image block comprises a backward prediction reference image block, wherein the initial coding prediction block comprises the initial backward coding prediction block, and wherein performing bidirectional prediction on the first coding block based on the prediction motion information to obtain the initial coding prediction block of the first coding block comprises performing backward prediction on the first coding block based on the backward prediction motion information to obtain the initial backward coding prediction block of the first coding block.

4. The method of claim 1, wherein obtaining the first coding prediction block of the first coding block comprises:
    performing weighted summation on the initial forward coding prediction block and the initial backward coding prediction block to obtain the first coding prediction block of the first coding block;
    using the initial forward coding prediction block as the first coding prediction block of the first coding block; or
    using the initial backward coding prediction block as the first coding prediction block of the first coding block.

5. The method of claim 1, wherein the motion vector predictor comprises a forward motion vector predictor or a backward motion vector predictor and the prediction reference image block comprises a forward prediction reference image block or a backward prediction reference image block, wherein each second coding prediction block comprises a forward second coding prediction block or a backward second coding prediction block, and wherein performing the motion search of the first precision on the prediction reference image block to obtain the at least one second coding prediction block comprises:
    performing the motion search of the first precision on the forward prediction reference image block based on the forward motion vector predictor to obtain the at least one second coding prediction block; or
    performing the motion search of the first precision on the backward prediction reference image block based on the backward motion vector predictor to obtain the at least one second coding prediction block,
    wherein the first precision comprises integer pixel precision, ½ pixel precision, ¼ pixel precision, or ⅛ pixel precision.

6. The method of claim 5, wherein the target motion vector predictor comprises a target forward motion vector predictor or a target backward motion vector predictor, and wherein calculating the difference between the first coding prediction block and each second coding prediction block and using the smallest motion vector predictor between the first coding block and the second coding prediction block with the smallest difference as the target motion vector predictor of the first coding block comprises:
    comparing differences between the forward second coding prediction blocks and the first coding prediction block and using a target forward motion vector predictor between the first coding block and a smallest forward second coding prediction block with a smallest difference as the target motion vector predictor; or comparing differences between the backward second coding prediction blocks and the first coding prediction block and using a target backward motion vector predictor between the first coding block and a smallest backward second coding prediction block with a smallest difference as the target motion vector predictor.

7. The method of claim 6, wherein the third coding prediction block of the first coding block comprises a forward third coding prediction block or a backward third coding prediction block, and wherein performing bidirectional prediction on the first coding block based on the target motion vector predictor to obtain the third coding prediction block of the first coding block comprises:

performing forward prediction on the first coding block based on the target forward motion vector predictor to obtain the forward third coding prediction block of the first coding block; or performing backward prediction on the first coding block based on the target backward motion vector predictor to obtain the backward third coding prediction block of the first coding block.

8. The method of claim 7, wherein obtaining the target coding prediction block of the first coding block based on the third coding prediction block comprises:

performing weighted summation on the forward third coding prediction block and the backward third coding prediction block to obtain the target coding prediction block of the first coding block; or using the forward third coding prediction block as the target coding prediction block of the first coding block; or using the backward third coding prediction block as the target coding prediction block of the first coding block.

9. A method for image decoding through inter-prediction, comprising:

determining prediction motion information of a first decoding block, wherein the prediction motion information comprises a motion vector predictor and prediction reference image information used to represent a prediction reference image;

performing bidirectional prediction on the first decoding block based on the prediction motion information to obtain an initial decoding prediction block of the first decoding block, wherein the initial decoding prediction block comprises at least one of an initial forward decoding prediction block obtained based on forward decoding prediction of the first decoding block or an initial backward decoding prediction block obtained based on backward decoding prediction of the first decoding block;

obtaining a first decoding prediction block of the first decoding block using at least one of the initial forward decoding prediction block or the initial backward decoding prediction block;

performing a bidirectional motion search of a first precision on the prediction reference image block to obtain at least one second decoding prediction block, wherein a search location of the motion search is based on the motion vector predictor and the first precision;

calculating a difference between the first decoding prediction block and each second decoding prediction block;

using a smallest motion vector predictor between the first decoding block and a second decoding prediction block with a smallest difference as a target motion vector predictor of the first decoding block;

performing bidirectional prediction on the first decoding block based on the target motion vector predictor to obtain a third decoding prediction block of the first decoding block;

obtaining a target decoding prediction block of the first decoding block based on the third decoding prediction block; and decoding the first decoding block based on the target decoding prediction block.

10. The method of claim 9, wherein the prediction motion information comprises forward prediction motion information, the motion vector predictor comprises a forward motion vector predictor, and the prediction reference image block comprises a forward prediction reference image block, wherein the initial decoding prediction block comprises the initial forward decoding prediction block, and wherein performing bidirectional prediction on the first decoding block based on the prediction motion information to obtain the initial decoding prediction block of the first decoding block comprises performing forward prediction on the first decoding block based on the forward prediction motion information to obtain the initial forward decoding prediction block of the first decoding block.

11. The method of claim 9, wherein the prediction motion information comprises backward prediction motion information, the motion vector predictor comprises a backward motion vector predictor, and the prediction reference image block comprises a backward prediction reference image block, wherein the initial decoding prediction block comprises the initial backward decoding prediction block, and wherein performing bidirectional prediction on the first decoding block based on the prediction motion information to obtain the initial decoding prediction block of the first decoding block comprises performing backward prediction on the first decoding block based on the backward prediction motion information to obtain the initial backward decoding prediction block of the first decoding block.

12. The method of claim 9, and wherein obtaining the first decoding prediction block of the first decoding block based on the initial decoding prediction block comprises:

performing weighted summation on the initial forward decoding prediction block and the initial backward decoding prediction block to obtain the first decoding prediction block of the first decoding block;

using the initial forward decoding prediction block as the first decoding prediction block of the first decoding block; or using the initial backward decoding prediction block as the first decoding prediction block of the first decoding block.

13. The method of according to claim 9, wherein the motion vector predictor comprises a forward motion vector predictor or a backward motion vector predictor and the prediction reference image block comprises a forward prediction reference image block or a backward prediction reference image block, wherein each second decoding prediction block comprises a forward second decoding prediction block or a backward second decoding prediction block, and wherein performing the motion search of the first precision on the prediction reference image block to obtain the at least one second decoding prediction block comprises:

performing motion search of the first precision on the forward prediction reference image block based on the forward motion vector predictor to obtain the at least one second decoding prediction block; or performing motion search of the first precision on the backward prediction reference image block based on the backward motion vector predictor to obtain the at least one second decoding prediction block, wherein the first precision comprises integer pixel precision, ½ pixel precision, ¼ pixel precision, or ⅛ pixel precision.

14. The method of claim 13, wherein the target motion vector predictor comprises a target forward motion vector predictor or a target backward motion vector predictor, and wherein calculating the difference between the first decoding prediction block and each second decoding prediction block and using the smallest motion vector predictor between the first decoding block and the second decoding prediction block with the smallest difference as the target motion vector predictor of the first decoding block comprises:

comparing differences between the forward second decoding prediction blocks and the first decoding prediction block and using a target forward motion vector predictor between the first decoding block and a smallest forward second decoding prediction block with a smallest difference as the target motion vector predictor; or comparing differences between the backward second decoding prediction blocks and the first decoding prediction block and using a target backward motion vector predictor between the first decoding block and a smallest backward second decoding prediction block with a smallest difference as the target motion vector predictor.

15. The method of claim 14, wherein the third decoding prediction block of the first decoding block comprises a forward third decoding prediction block or a backward third decoding prediction block, and wherein performing bidirectional prediction on the first decoding block based on the target motion vector predictor to obtain the third decoding prediction block of the first decoding block comprises:

performing forward prediction on the first decoding block based on the target forward motion vector predictor to obtain the forward third decoding prediction block of the first decoding block; or performing backward prediction on the first decoding block based on the target backward motion vector predictor to obtain the backward third decoding prediction block of the first decoding block.

16. The method of claim 15, wherein obtaining the target decoding prediction block of the first decoding block based on the third decoding prediction block comprises:

performing weighted summation on the forward third decoding prediction block and the backward third decoding prediction block to obtain the target decoding prediction block of the first decoding block; or using the forward third decoding prediction block as the target decoding prediction block of the first decoding block; or using the backward third decoding prediction block as the target decoding prediction block of the first decoding block.

17. An apparatus for image decoding through inter-prediction, comprising:

a processor; and a memory coupled to the processor and for storing instructions that, when executed by the processor, cause the processor to:

determine prediction motion information of a first decoding block, wherein the prediction motion information comprises a motion vector predictor and prediction reference image information used to represent a prediction reference image block;

perform bidirectional prediction on the first decoding block based on the prediction motion information to obtain an initial decoding prediction block of the first decoding block, wherein the initial decoding prediction block comprises at least one of an initial forward decoding prediction block obtained based on forward decoding prediction of the first decoding block or an initial backward decoding prediction block obtained based on backward decoding prediction of the first decoding block;

obtain a first decoding prediction block of the first decoding block using at least one of the initial forward decoding prediction block or the initial backward decoding prediction block;

perform a bidirectional motion search of a first precision on the prediction reference image block to obtain at least one second decoding prediction block, wherein a search location of the motion search is based on the motion vector predictor and the first precision;

calculate a difference between the first decoding prediction block and each second decoding prediction block;

use a smallest motion vector predictor between the first decoding block and a second decoding prediction block with a smallest difference as a target motion vector predictor of the first decoding block;

perform bidirectional prediction on the first decoding block based on the target motion vector predictor to obtain a third decoding prediction block of the first decoding block;

obtain a target decoding prediction block of the first decoding block based on the third decoding prediction block; and decode the first decoding block based on the target decoding prediction block.

18. The apparatus of claim 17, wherein the prediction motion information comprises forward prediction motion information, the motion vector predictor comprises a forward motion vector predictor, and the prediction reference image block comprises a forward prediction reference image block, wherein the initial decoding prediction block comprises the initial forward decoding prediction block, and wherein the instructions, when executed by the processor, further cause the processor to perform forward prediction on the first decoding block based on the forward prediction motion information to obtain the initial forward decoding prediction block of the first decoding block.

19. The apparatus of claim 18, wherein the prediction motion information comprises backward prediction motion information, the motion vector predictor comprises a backward motion vector predictor, and the prediction reference image block comprises a backward prediction reference image block, wherein the initial decoding prediction block comprises the initial backward decoding prediction block, and wherein the instructions, when executed by the processor, further cause the processor to perform backward prediction on the first decoding block based on the backward prediction motion information to obtain the initial backward decoding prediction block of the first decoding block.

20. The apparatus of claim 19, wherein the instructions, when executed by the processor, cause the processor to:

perform weighted summation on the initial forward decoding prediction block and the initial backward decoding prediction block to obtain the first decoding prediction block of the first decoding block;

use the initial forward decoding prediction block as the first decoding prediction block of the first decoding block; or use the initial backward decoding prediction block as the first decoding prediction block of the first decoding block.

* * * * *